(12) United States Patent
Stier et al.

(10) Patent No.: US 6,587,847 B1
(45) Date of Patent: Jul. 1, 2003

(54) METHOD AND SYSTEM FOR MONITORING KNOWLEDGE USE

(75) Inventors: Sharon Stier, Wrentham, MA (US); Debra Ann Haughton, Attleboro, MA (US)

(73) Assignee: Stream International, Inc., Canton, MA (US)

( * ) Notice: Subject to any disclaimer, the term of this patent is extended or adjusted under 35 U.S.C. 154(b) by 0 days.

(21) Appl. No.: 09/379,687

(22) Filed: Aug. 24, 1999

(51) Int. Cl.$^7$ .................................................. G06N 5/02
(52) U.S. Cl. .................................. 706/50; 707/2; 707/3
(58) Field of Search ............................ 706/50, 10, 46, 706/52; 707/4, 3, 5, 2; 704/9; 714/26

(56) References Cited

U.S. PATENT DOCUMENTS 5,325,505 A * 6/1994 Hoffecker et al. .......... 707/101
6,134,541 A * 10/2000 Castelli et al. ................. 707/2
6,289,353 B1 * 9/2001 Hazlehurst et al. ......... 707/102

OTHER PUBLICATIONS

Brown et al, Using Explicit requirements and Metrics for Interface agent User Model Correction, Jan. 1998, ACM, Autonomous Agents 98 Mineapolis MN USA, 1–7.*

* cited by examiner

Primary Examiner—Wilbert L. Starks, Jr.
Assistant Examiner—Joseph P. Hirl
(74) Attorney, Agent, or Firm—Maura K. Moran

(57) ABSTRACT

Improving an entity's operational performance involves monitoring use of its knowledge by measuring use of a knowledge base storing its knowledge, and monitoring knowledge that it generates by evaluating knowledge quality and efficiency of its knowledge generation. In another embodiment, an entity's operational performance is improved by developing processes to build knowledge and sustain its knowledge use, developing systems to facilitate reuse of knowledge (including storing its knowledge in a knowledge base); and developing systems to generate knowledge and incorporate it into the knowledge base. The entity's knowledge use is analyzed to analyze its operational performance. Its knowledge use is monitored by monitoring use of the knowledge base, through defining at least one characteristic of knowledge base use, developing at least one metric for measuring that characteristic, collecting data on the characteristic from knowledge base use and, using the metric, creating a measurement of the characteristic, and monitoring the measurement.

17 Claims, 22 Drawing Sheets

Fig. 1b
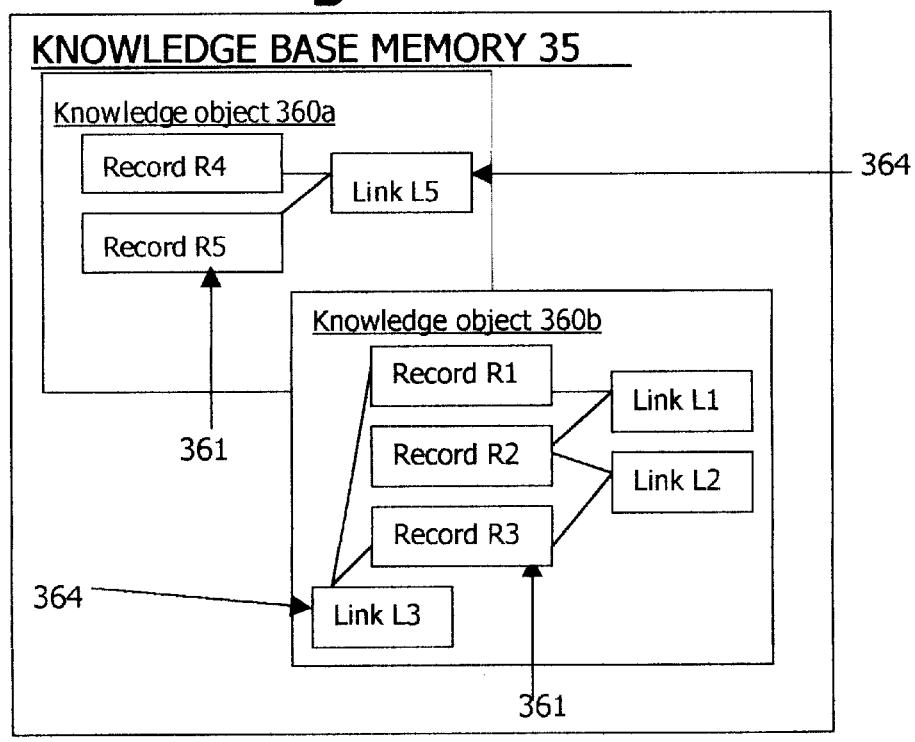
Fig. 1c
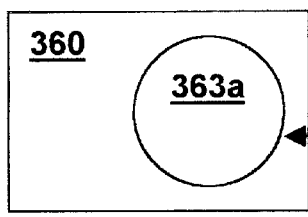
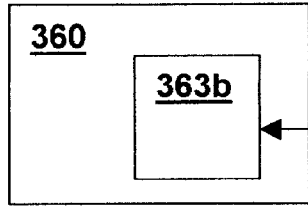
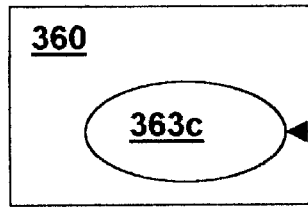
Fig. 1d
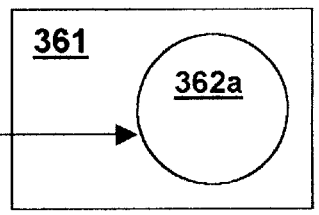
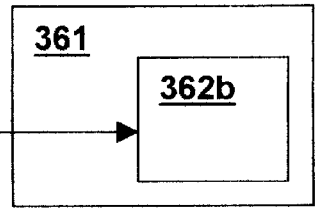
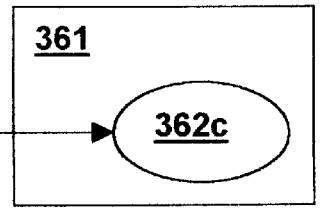

Fig. 18

DAILY USER HIT RATE REPORT 441

| AGENT | PENDING USE | ACTIVE USE | TOTAL USE | KNOWLEDGE HIT RATE |
|---|---|---|---|---|
| 443 | 444 | 445 | 446 | 447 |
| 13a | 408a | 429a | 407a | 434a |
| .. | .. | .. | .. | .. |
| 13z | 408z | 429z | 407z | 434z |
| TOTALS | 408' | 429' | 407' | 434' |

Fig. 19

WEEKLY USER HIT RATE REPORT 481

| AGENT | PENDING USE | ACTIVE USE | TOTAL USE | KNOWLEDGE HIT RATE |
|---|---|---|---|---|
| 483 | 484 | 485 | 486 | 487 |
| 13a | 408a | 429a | 407a | 434a |
| .. | .. | .. | .. | .. |
| 13z | 408z | 429z | 407z | 434z |
| TOTALS | 408' | 429' | 407' | 434' |

Fig. 20

DOMAIN USE REPORT 451

| DOMAIN | QUERIES 453 | TRANSACTIONS 454 | DOMAIN USE RATE METRICS 455 |
|---|---|---|---|
| 312a | 421a | 424a | 432a |
| .. | .. | .. | .. |
| 312z | 421z | 424z | 432z |

Fig. 21

AGENT USE REPORT 471

| NO. AGENTS USED 473 | NO. AGENTS AUTHORIZED AND AVAILABLE 474 | AGENT USE RATE 475 |
|---|---|---|
| 427 | 428 | 433 |

Fig. 22

PENDING KNOWLEDGE OBJECTS BALANCE SHEET BY WEEK REPORT 461

| Period Week Ending | Pending Start 462 | Pending Added 463 | Promoted to Active 465 | Discarded to Obsolete 466 | Pending Left 464 | % Activated 456 | Avg. Days to Active 467 |
|---|---|---|---|---|---|---|---|
| | 478 | 408' | 435 | 479* | 478' | 436 | 437' |

Fig. 23

KNOWLEDGE OBJECTS CREATED BY WEEK REPORT 491

KNOWLEDGE OBJECT ID: 360R   AUTHOR: 14R   CREATION DATE: 360'R

REUSE (FOR WEEK): 365*R   111R   WEIGHT: 365R   112R

| RECORD TYPE | RECORD NAME 361R |
|---|---|
| Hardware 362e | 361e-r |
| Software 362f | 361f-r |
| Environment 362g | 361g-r |
| Issue 362a | 361a-r |
| Cause 362b | 361b-r |
| Resolution 362c | 361c-r |

110'R   110R

Total Knowledge Objects (Knowledge Delivery Volume): 438"

Fig. 24

KNOWLEDGE RE-USE BY SUGGESTION ORIGINATOR FOR THE WEEK REPORT 130

| SUGGESTION ORIGINATOR 131 | KNOWLEDGE OBJECTS AUTHORED 132 | CREATE DATE 133 | KNOWLEDGE OBJECT REUSE 135 |
|---|---|---|---|
| 13W | ID 360A<br>ID 360F<br>ID 360U | DATE A<br>DATE F<br>DATE U | 365*A<br>365*F<br>365*U |
| AGENT TOTALS: 134W | 134"W | | 134*W |
| 13Q | ID 360B<br>ID 360G | DATE B<br>DATE G | 365*B<br>365*G |
| AGENT TOTALS: 134Q | 134"Q | | 134*Q |
| TOTALS: 134' | 134'A | | 134'B |

METHOD AND SYSTEM FOR MONITORING KNOWLEDGE USE

RELATED APPLICATIONS

This invention relates to the following applications, filed on the even date herewith, and herein incorporated by reference:

U.S. Ser. No. 09/382,057, entitled *Method and System for Development of a Knowledge Base System*, by Sharon Stier and Debra Haughton (Applicant Reference No. S1/P01);

U.S. Ser. No. 09/379,822, entitled *Method of Selecting Desired Domains and for Developing a Seeding Methodology for a Knowledge Base System*, by Sharon Stier and Debra Haughton (Applicant Reference No. S1/P02);

U.S. Ser. No. 09/379,694, entitled *Method and System for Use and Maintenance of a Knowledge Base System*, by Sharon Stier, Debra Haughton, and Joseph Melino (Applicant Reference No. S1/P04);

U.S. Ser. No. 09/379,692, entitled *Method of Incorporating Knowledge into a Knowledge Base System*, by Sharon Stier and Debra Haughton (Applicant Reference No. S1/P05).

BACKGROUND OF THE INVENTION

This invention relates generally to knowledge management systems, and particularly to the development, use and maintenance of knowledge base systems.

One environment in which knowledge management systems are particularly useful is the computer product support industry. The computer systems on today's desktops are complicated. They involve many products (hardware and software) from many vendors. The products may or may not operate as expected when configured into a system. In addition, the user guides and references for the products are often incomplete and not always accurate. When end users have problems with their computer systems, they often need help diagnosing and then solving the problem. The computer product support industry has developed in response to that need. When a caller into a technical support organization reports a problem with a product in a certain environment, a technical support representative, sometimes known as an agent, diagnoses and attempts to solve the problem.

However, a mountain of knowledge is necessary in order to provide support for computer products. End users' answers might be found in a public document, or in a customer's or vendor's confidential information, or in a company's bank of general or confidential knowledge. In addition, through support interactions, a company generates a vast array of knowledge, particularly in areas such as product interoperability. Knowledge is always being generated because the resolution to an end user's problem may even need to be pieced together from many sources of information, public and private combined.

A computer product support provider's challenge is to handle the increasing technical complexity of support delivery while keeping service quality and customer satisfaction high and costs low. Companies must establish a support infrastructure that enable them to capture, refine, and publish customer service and support information with greater efficiency through a variety of support channels. Adopting a knowledge management approach is an effective means to meet urgent customer demands.

One part of the knowledge management approach is the development and maintenance of knowledge bases as a part of a company's knowledge management system. With the proliferation of information that is needed to run businesses today, many companies are turning to knowledge base systems to store and provide access to its information. Knowledge bases provide a framework for collecting, organizing and refining the full range of information that is both collected and generated daily by a company. Knowledge bases process the new information, transforming it into actionable knowledge, present it in a consistent format, and make it readily available. They make a company increasingly effective in gathering and leveraging "institutional memory." Thus, knowledge bases provide a company with the opportunity to reuse the knowledge that it collects and creates. Such reuse is beneficial because it allows companies to use its data to conduct is business more quickly and efficiently than previously possible.

While knowledge bases provide some real benefit to companies that invest in their creation, they are expensive in time, resources and money to develop and maintain. Once deployed, knowledge bases need careful maintenance to keep up to date. Even when a company incorporates its new knowledge into a knowledge base, thus reusing its knowledge, sometimes its business needs change, rendering the knowledge base not as useful as it had been in the past. The knowledge base may not be used as often as it should be. It is sometimes difficult to determine whether the knowledge base is being used appropriately for the business objectives of the company that developed it or for the customer for which the company developed the knowledge base.

It is therefore an object to treat knowledge as an asset that provides a substantial competitive advantage, and to leverage knowledge to improve customer satisfaction. It is an object of this invention to develop knowledge management systems that allow a company to manage the knowledge it collects and creates, make it available for use it in conjunction with the other systems and processes used by the company, and monitor its use.

SUMMARY OF THE INVENTION

In accordance with the present invention, there is described a method of monitoring knowledge use by an entity by measuring use of a knowledge base in which is stored the knowledge. First at least one characteristic of the use of the knowledge base is defined, then at least one metric for measuring the characteristic is developed. From data about the use of the knowledge base, data is collected on the characteristic and, using the metric, a measurement of the characteristic is created. The measurement is then monitored to monitor the use. In the preferred embodiment, the metrics are organized into a metric matrix to identify the metrics and facilitate reporting and analysis of the knowledge use.

In one embodiment, one of the metrics is a domain use rate metric. The domain use metric is a percentage calculated from the number of times that the knowledge base is queried in response to a request for information about a domain, compared to the total number of requests for information involving the domain for a selected period of time. Another metric is an agent use rate metric that is a percentage calculated from the number of agents that have queried the knowledge base in a selected period of time in response to a request for information, compared to the total number of agents responding to requests for information on a domain.

A third metric is a knowledge hit rate metric that is a percentage calculated from the number of times that an acceptable resolution is found to a request for information when the knowledge base is queried, compared to the total number of times that the knowledge base is queried, for a selected period of time. A fourth metric is a knowledge turnaround time, which is the average time elapsed from the time that a suggestion is made for new knowledge to be incorporated into the knowledge base until the time of availability of the new knowledge in the knowledge base.

A fifth metric is a measure of growth of the knowledge generated and incorporated into the knowledge base. In the preferred embodiment, growth is measured in absolute and relative terms. The measure of absolute knowledge growth is a count of the number of new knowledge objects added to the knowledge base in a selected period. The measure of percentage of growth of the knowledge is a percentage calculated from the absolute knowledge growth, compared to a count of the number of existing knowledge objects in the knowledge base at the beginning of the selected period of time.

In the preferred embodiment, knowledge is developed in response to requests for information at the request of a second entity, and one metric is a knowledge delivery volume, which is a measurement of growth of the knowledge delivered to the second entity. The knowledge delivery volume is a count of the number of new knowledge objects delivered to the second entity in a selected period of time.

Also in the preferred embodiment, the monitoring of knowledge use further involves reporting on the use of the knowledge base using a reporting system that compiles instantiation reports and aggregation reports. Instantiation reports documenting individual instances of the use, the reports identifying for each instance of access to the knowledge base at least one query presented and resolutions suggested by the knowledge base. Aggregation reports track for a selected period of time the number of times an event occurs in use of the knowledge base. They are created by polling selected counters that keep track of the number of times the event occurs.

In accordance with a further aspect of the invention, there is also described a method of improving the operational performance of an entity by developing processes to build and sustain use of knowledge by the entity. The steps involve developing systems to facilitate reuse of the knowledge, especially storing the knowledge in a knowledge base and monitoring the use of the knowledge base in the manner described above. The monitored measurements are analyzed to analyze the knowledge base use; and knowledge base use is then analyzed to analyze the operational performance.

In accordance with a further aspect of the invention, there is also described a method of monitoring the operational performance of an entity, involving monitoring knowledge use by the entity by measuring use of a knowledge base in which is stored the knowledge, and by evaluating knowledge generated by the entity for efficiency of the generate and quality of the generated knowledge.

BRIEF DESCRIPTION OF THE DRAWINGS

The above-mentioned and other features of the invention will become more apparent by reference to the following description taken in connection with the accompanying drawings in which:

FIG. 1b is a block diagram of the knowledge base memory 35 show in FIG. 1a;

FIG. 1c is a block diagram of the knowledge objects 360 shown in FIG. 1a, showing in general different knowledge object types;

FIG. 1d is a block diagram of the records 361 shown in FIG. 1b, showing in general different record types;

FIG. 1e is a more detailed block diagram of the front end 20 of FIG. 1a;

FIG. 2 is block diagram view of a knowledge management system 50 for developing and maintaining the knowledge base system 10 shown in FIG. 1a;

FIG. 3 is a diagrammatic representation of a knowledge object 360 having a knowledge object type 363a;

FIG. 6 is a block diagram view of the workflow system 470 shown in FIG. 1a;

FIG. 7 is a block diagram of the knowledge monitoring system 430 shown in FIG. 1a;

FIG. 16 is a block diagram of the monitoring reporting subsystem 42 shown in FIG. 1a;

FIG. 18 is an example of the Daily User Hit Rate report 441 shown in FIG. 16;

FIG. 19 is an example of the Weekly User Hit Rate report 481 shown in FIG. 16;

FIG. 20 is an example of the Domain Use report 451 shown in FIG. 16;

FIG. 21 is an example of the Agent Use Report 471 shown in FIG. 16;

FIG. 22 is an example of the Pending Knowledge Objects Balance Sheet by Week report 461 shown in FIG. 16;

FIG. 23 is an example of the Knowledge Objects Created by Week report 491 shown in FIG. 16; and FIG. 24 is an example of the Knowledge Re-use by Suggestion Originator for the Week report 130.

DESCRIPTION OF THE PREFERRED EMBODIMENTS GENERAL

The preferred embodiment for this invention is a knowledge base that has been developed for use in the technical support environment. Such systems provide knowledge about hardware, software, the environments in which they are used, and any customer-specific support requirements, such as specific workflow or scripts to follow. A knowledge management system can be used to collect and process that data, and present it in a consistent fashion in a knowledge base, which can assist the agent in identifying a likely cause of the problem and resolution.

Figure 1A:
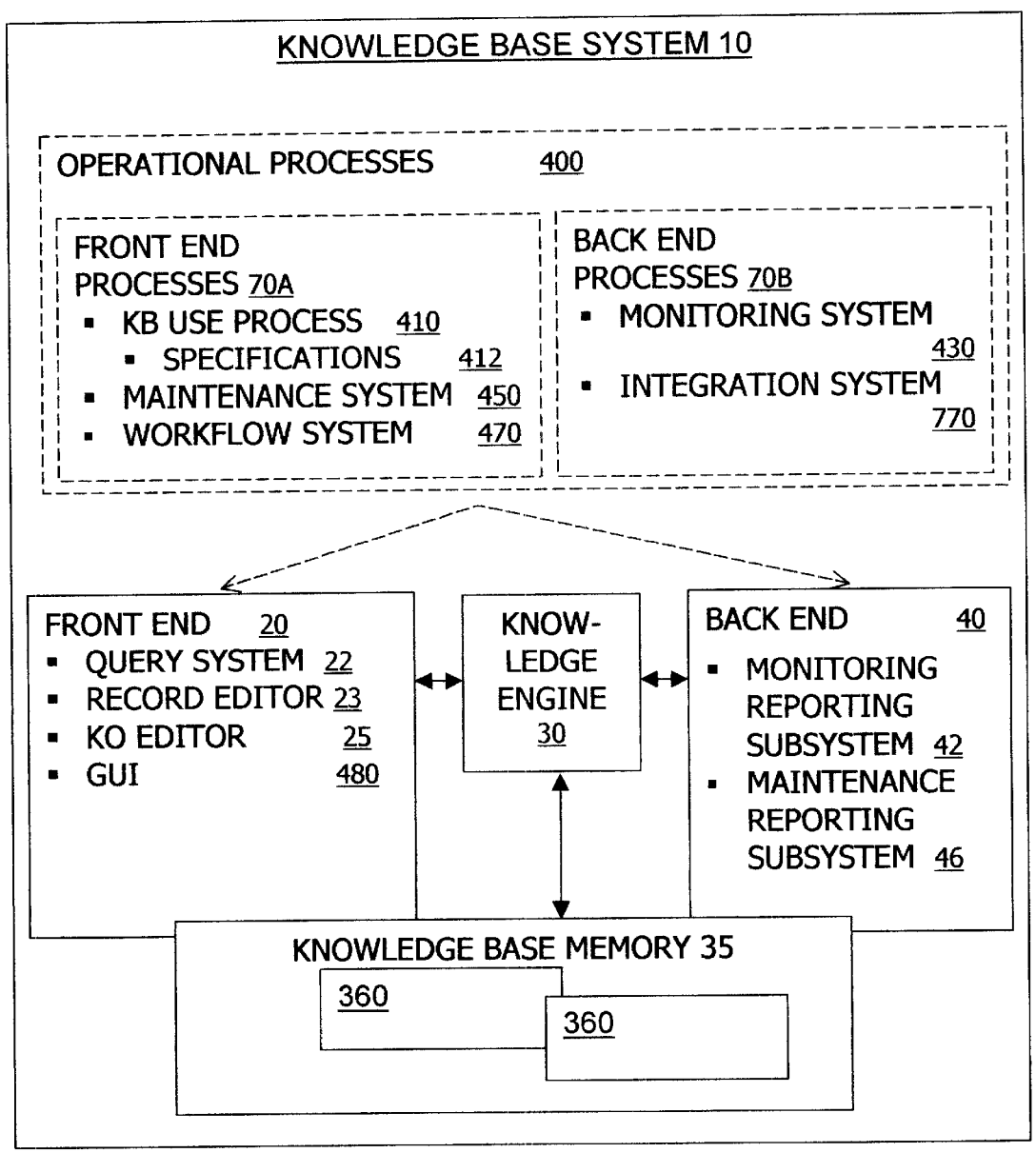
FIG. 1a is a block diagram view of a knowledge base system of the preferred embodiment.

FIG. 1a shows a knowledge base system 10 having a knowledge engine 30, a knowledge base memory 35, a front end 20 for accessing the engine 30 and memory 35, and a back end 40 consisting of metrics and reporting for testing and modifying the knowledge base system 10 and for providing customer feedback. Coupled to the knowledge engine 30 is a knowledge base memory 35. The front end 20 has a query system 22 for submitting queries to the knowledge engine 30, a record editor 23 for entering and editing records in the knowledge base memory 35, a knowledge object editor 25 for entering and editing records in the knowledge base memory 35, and a graphic users interface (GUI) 480, shown as GUI 480 in FIG. 1a, to allow access to the query system 22 and the editors 23, 25. The back end 40 has a knowledge monitoring reporting subsystem 42 and a knowledge maintenance reporting subsystem 46 to provide reports of knowledge base use activity.

In the preferred embodiment, the knowledge engine 30 is a cognitive processor such as the KnowledgeBridge™ processor available from ServiceWare, Inc. of Oakmont, PA. The knowledge base system 10 is optimized for the KnowledgeBridge™ architecture, which implements a concept-association model of knowledge storage and retrieval using neural net, fuzzy logic, and advanced natural language technology. However, front and back ends 20, 40 are relatively independent of the knowledge engine 30, so that they could be used with virtually any knowledge providing system, such as, for example, a case-based reasoning system.

Figure 2:
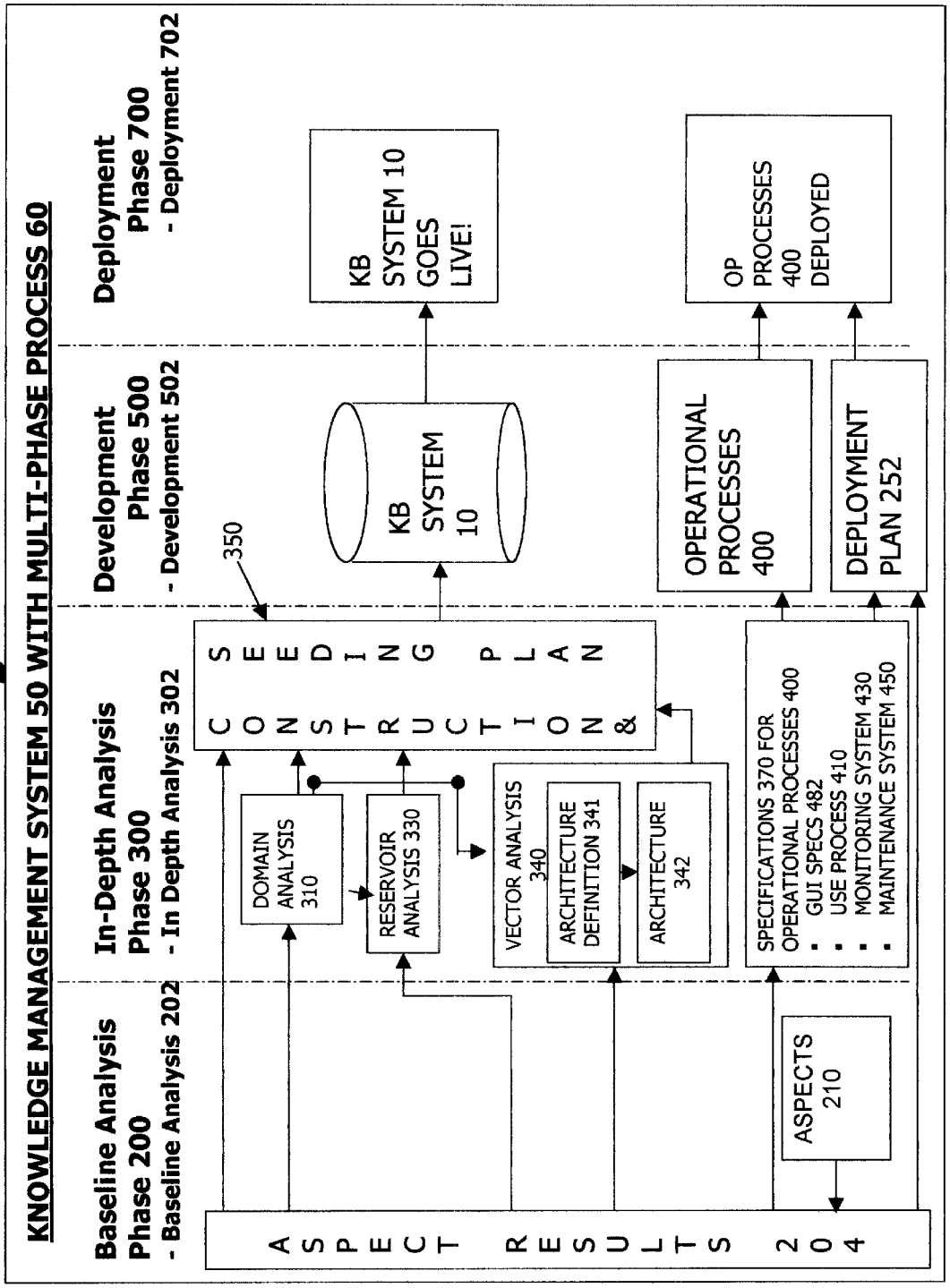

In the preferred embodiment, the knowledge base system 10 is developed and maintained through a knowledge management system 50 shown in FIG. 2. The knowledge management system 50 comprises a methodology to define and develop the knowledge base system 10 and to collect, organize, refine, publish and reuse information in the knowledge base system 10. The knowledge management system 50 also comprises supporting business processes and methodologies to keep the knowledge base updated, to integrate the knowledge base with the other systems and processes used by a user of the knowledge base, and to monitor use of the knowledge.

Multi-Phase Process 60

The knowledge management system 50 of the preferred embodiment provides for a targeted, easily used, monitorable, easily maintained knowledge base system 10. As shown in FIG. 2, its methodology to define and develop the knowledge base system 10 and to collect, organize, refine, publish and reuse information in the knowledge base system 10 involves a multi-phase process 60.

With the process 60, in a baseline analysis phase 200, a baseline analysis 202 is conducted of aspects 210 of developing the knowledge base system 10. The aspect results 204 are used in an in-depth analysis phase 300, in which an in-depth analysis 302 is conducted of the knowledge base development project. Specifically, a domain analysis 310 is conducted to identify a desired domain for the knowledge base system 10, a reservoir analysis 330 is conducted to identify the sources of knowledge for the knowledge base system 10, and a vector analysis 340 is conducted to decide how to organize the knowledge that is going to be stored in the knowledge base system 10. In addition, a construction and seeding plan 350, including a seeding methodology, not shown, for seeding the knowledge base system 10, is developed in the in-depth analysis phase 300, as are specifications 370 for operational processes 400 for operating the knowledge base system 10. In the development phase 500, development 502 of the knowledge base system 10 occurs in accordance with the construction and seeding plan 350, the operational processes 400 are developed in accordance with the specifications 370, and a deployment plan 252 is developed in accordance with the specifications 370 and aspect results 204 of the baseline analysis 202. In the deployment phase 700, deployment 702 of the knowledge base system 10 and operational processes 400 occurs in accordance with the deployment plan 252. The knowledge base system 10 is used to answer end-user queries. The operational processes 400 that were developed during the development phase 500 are used to monitor operations and to provide for continuous improvement of the knowledge base system 10.

The multi-phase process 60 of the methodology to define and develop a targeted, easily used, monitorable, easily maintained the knowledge base system 10 is described in detail in the co-pending related patent application, U.S. Ser. No. 09/382,057, entitled *Method and System for Development of a Knowledge Base System*, by Sharon Stier and Debra Haughton (Applicant Reference No. S1/P01). The method of identifying a desired domain for the knowledge base and of formulating a seeding methodology for the knowledge base system 10 is described in detail in the co-pending related patent application, U.S. Ser. No. 09/379,822, entitled *Method of Selecting Desired Domains and for Developing a Seeding Methodology for a Knowledge Base System*, by Sharon Stier and Debra Haughton (Applicant Reference No. S1/P02). Both were filed on the even date herewith and are herein incorporated by reference.

In the vector analysis 340, decisions are made about how to organize the information that is going to be stored in the knowledge base system 10. In so doing, the architecture 342 of the knowledge base is defined. During the architecture definition 341, authoring conventions and guides, not shown, containing the architectural definitions are developed to provide knowledge base uniformity during authoring of the knowledge base.

Returning to FIG. 1a, while referring to FIGS. 1b, 1c, 1d, 3 and 4, in the knowledge base system 10 of the present invention, the information in the knowledge base memory 35 is stored in knowledge objects 360 having a plurality of elements of information consisting of records 361 having associations, also known as links 364, between them. FIG. 1b shows knowledge objects 360a, 360b stored in the knowledge base memory 35. Knowledge object 360a has records R4 and R5. Records R4 and R5 are linked by link L5. Knowledge object 360b has records R1, R2, and R3. Records R1 and R2 are linked by link L1, records R1 and R3 are linked by link L3, and records R2 and R3 are linked by link L2.

Referring to FIGS. 1c and 1d, knowledge objects 360 are defined by knowledge object types 363, and records 361 are defined by record types 362. As an example, FIG. 1c shows knowledge object types 363a, 363b, and 363c for knowledge objects 360, and FIG. 1d shows record types 362a, 362b, and 362c for records 361. The definitions of knowledge object types 363 and record types 362 depend on the domain of the particular knowledge base. Inputs into record type 362 definition include requirements of the intended beneficiaries of the knowledge base, particularly any customers sponsoring the development of the knowledge base. In the preferred embodiment, the knowledge object and record types 363, 362 and definitions also depend on the multi-customer goals and strategy of the developer of the knowledge base.

Figure 3:
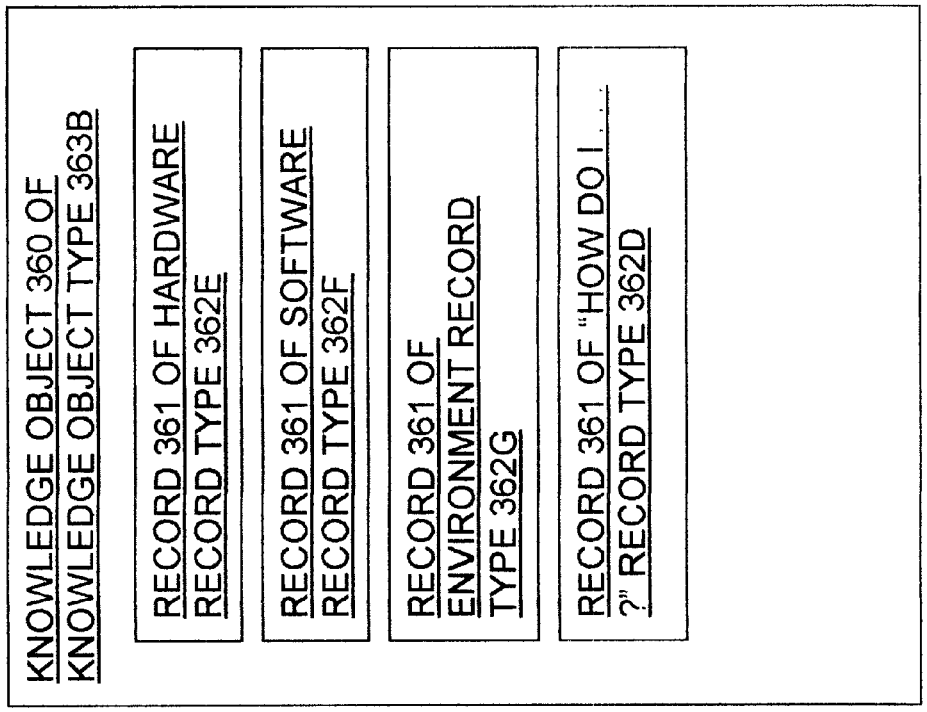
Figure 4:
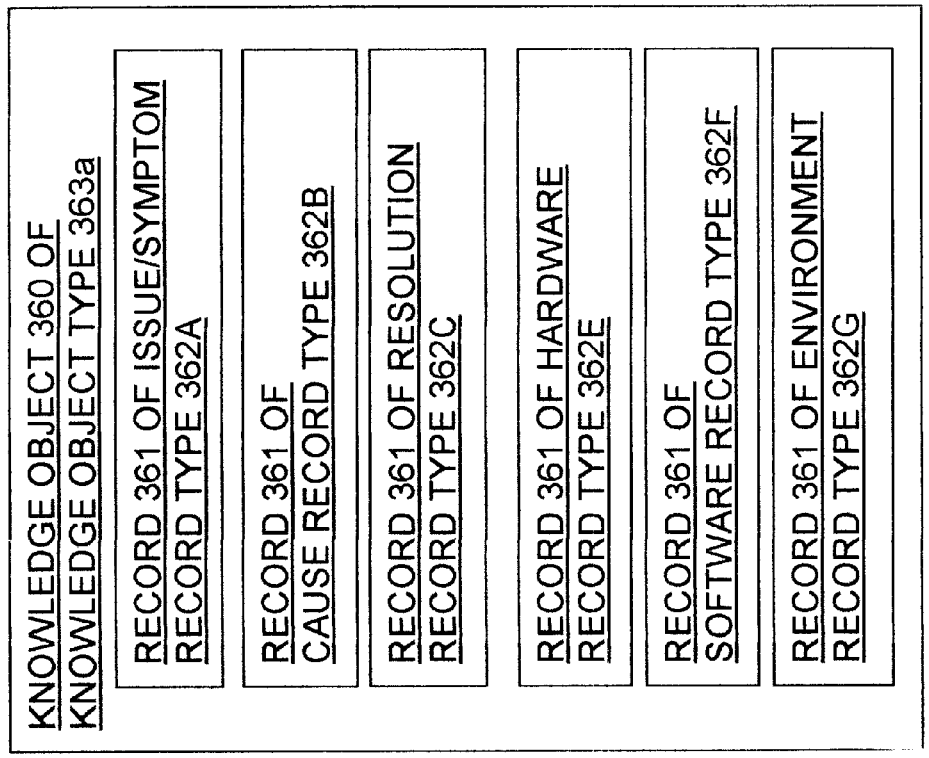
FIG. 4 is a diagrammatic representation of a knowledge object 360 having a knowledge object type 363b.

Referring to FIGS. 3 and 4, the architecture of the preferred embodiment supports resolution knowledge object type 363a and "How do I" knowledge object type 363b. The resolution knowledge object type 363a of the preferred embodiment identifies the factual circumstances of a support interaction and presents a resolution for the identified support interaction. It requires several record types 362a through 362g to define the support interaction. Knowledge object type 363a has three support record types (Issue/Symptom record type 362a, Cause record type 362b, Resolution record type 362c), and three product-specific record types (Hardware record type 362e, Software record type 362f, Environment record type 362g). The "How do I" knowledge object type 363b provides step by step instructions for installing, operating, or maintaining products. It has the three product-specific record types (Hardware record type 362e, Software record type 362f, Environment record type 362g) and a "How do I . . . ?" record type 362d.

In the technical support environment of the preferred embodiment, knowledge objects 360 represent a full support interaction, and records 361 represent the factual elements of the interaction. The architecture of the present invention treats the knowledge embodied in the support interaction as an object. The objectified knowledge, and the manner in which it is objectified and incorporated into the knowledge base system 10 are described in detail in the co-pending related application, U.S. Ser. No. 09/379,692, entitled *Method of Incorporating Knowledge into a Knowledge Base System*, by Sharon Stier and Debra Haughton (Applicant Reference No. S1/P05), which was filed on the even date herewith and is herein incorporated by reference.

Operational Processes 400

General

During the in-depth analysis phase 300, specifications 370 for operational processes 400 for use of the knowledge base are developed. Returning to FIG. 1a, the operational processes 400 include front end processes 70a for the front end 20 and back end processes 70b for the back end 40.

The front end processes 70a include a knowledge base use process 410 for use of the knowledge base system 10 and a knowledge maintenance system 450 for maintaining and continuously improving the knowledge base system 10. The use process 410 for use of the knowledge base system 10 and the knowledge maintenance system 450 are described in detail in the co-pending related application, U.S. Ser. No. 09/379,694, entitled *Method and System for Use and Maintenance of a Knowledge Base System*, by Sharon Stier, Debra Haughton, and Joseph Melino (Applicant Reference No. S1/P04), which was filed on the even date herewith and is herein incorporated by reference.

The back end processes 70b include a knowledge monitoring system 430 for monitoring knowledge base operations. During the in-depth analysis phase 300, the knowledge maintenance reporting subsystem 46 of the back end 40 is developed to support the knowledge monitoring system 430.

Knowledge Base Use Process 410

Figure 6:
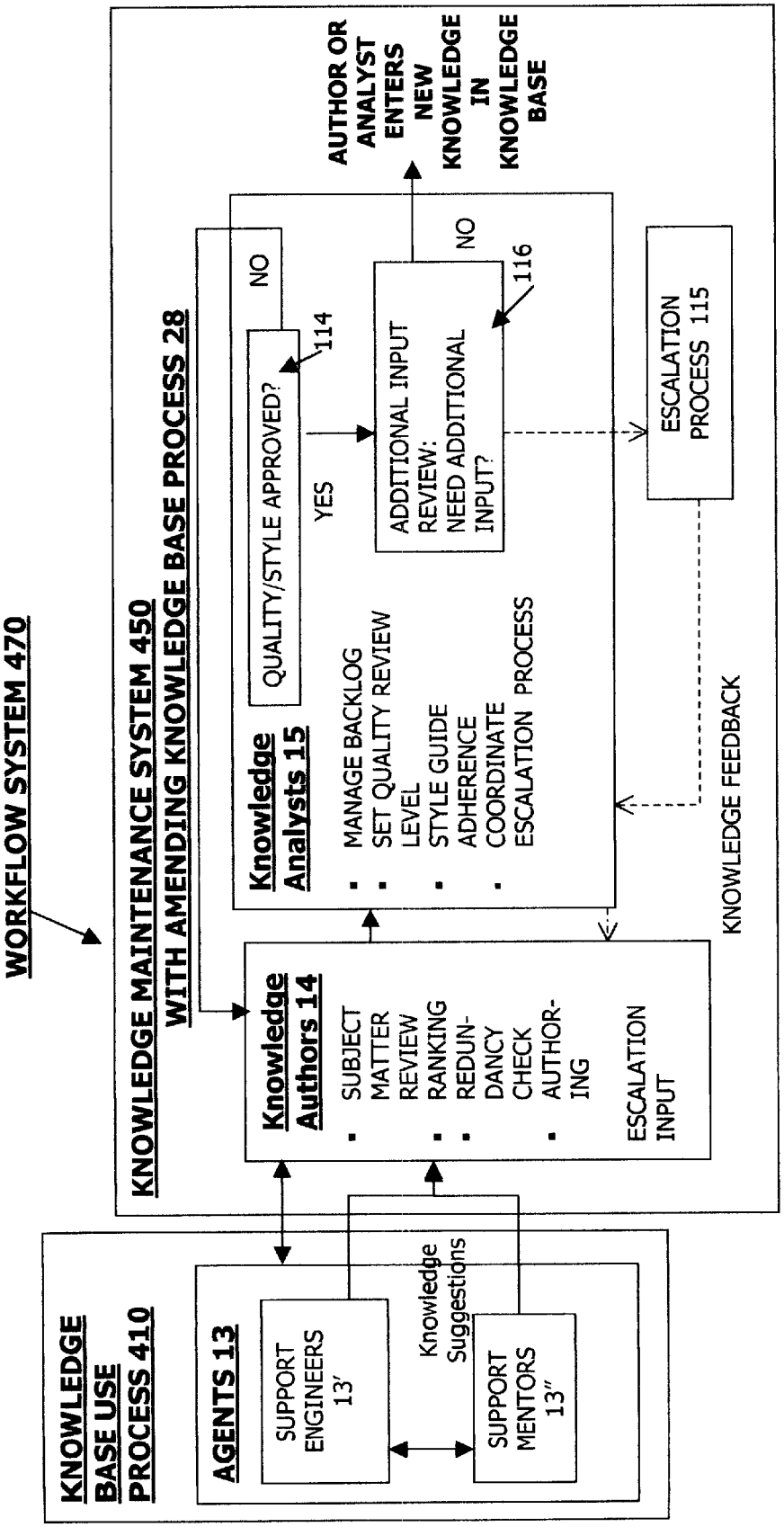

After a desired domain 312 is selected and the knowledge base development and construction plan 350 is developed, the workflow system 470 for use of the planned knowledge base system 10 is developed. Decisions are made as to who will use the knowledge base and how they will use it. Decisions are also made as to who will maintain the knowledge base and how they will maintain it. In the preferred embodiment, as shown in FIG. 6, the workflow system 470 involves the process 410 for agent use of the knowledge base system 10 and the knowledge maintenance system 450 for maintenance for the system 10. Agents 13, who may be support engineers 13' or support mentors 13", follow the use process 410 to use the knowledge base system 10 to answer support queries. They search the knowledge base memory 35 for active knowledge objects that represent solutions to the problems presented to the agents.

As the agents 13 use the knowledge base system 10, their description of the problem and the knowledge base's response will be saved. If the combined query and response is not unique, the agents 13 will have accessed an existing knowledge object, which is in the active state. The knowledge engine 30 will note the accessing of an active knowledge object and then use the interaction to strengthen the knowledge base. If the combined query and response is unique, not yet present in the knowledge base, or if the agent provides additional input documenting a problem with the knowledge base, the knowledge engine 30 will treat the interaction as a new knowledge object, putting it into a pending state and making it available for review by knowledge authors 14, who populated the knowledge base and then keep it updated, and by knowledge analysts 15, who have overall responsibility for keeping the knowledge base system 10 current, accurate and structured so that it is easily searchable.

The process 410 for agent use of the knowledge base system 10 is described in detail in the co-pending patent application, U.S. Ser. No. 09/379,694, entitled *Method and System for Use and Maintenance of a Knowledge Base System*, by Sharon Stier, Debra Haughton, and Joseph Melino (Applicant Reference No. S1/P04). It was filed on the even date herewith, and herein incorporated by reference:

It involves an agent 13 initiating a query by describing the symptoms of the problem as she knows them. She may narrow her search by entering additional facts about the problem such as product or environment type. She submits her query and receives a possible set of issues that could be the actual issue of the problem causing use the symptoms that she has described. The agent 13 selects the issue that she wants to test for its likelihood of being the actual issue, and performs any appropriate test to confirm or deny the issue. Once she has selected an issue, the agent 13 tests the returned causes, and selects one. She then tests the returned resolutions. When the agent selects a correct resolution, she may then guide the support requester through the indicated resolution steps. She may then save her query.

When the agent 13 recognizes that her query represents missing, incorrect, or incomplete knowledge in the knowledge base, before saving the interaction, she may create a memo outlining the problem with the knowledge base and suggesting the knowledge that should be added to the knowledge base. When she saves the query, the memo will be available for review by the authors 14 and analysts 15 responsible for maintaining the knowledge base system 10.

The Knowledge Maintenance System 450

The knowledge maintenance system 450 provides for populating the knowledge base and for the review of agent queries and updating the knowledge base memory 35 if a need for new content is indicated by the query. It includes the amending knowledge base processes 28, which are the processes an author 14 or analyst 15 would use to add, modify, and delete the records and knowledge objects in the knowledge base memory 35.

Agent input into the knowledge base is always in the pending state. The knowledge maintenance system 450 provides that only knowledge authors 14 and knowledge analysts 15 are able to activate knowledge objects by adding new knowledge objects to the knowledge base memory 35, or by removing the pending status of agent queries, which are stored in the memory 35 as pending knowledge objects 360. If the query knowledge engine 30 recognizes that the combination of records and links constitutes a knowledge object 360 that has already been entered into the knowledge base, the query is used to strengthen the knowledge base system 10. If the query represented a new knowledge object 360 or if new content is indicated the query summary, an author 14 will review the query and, if new content is indicated, incorporate the new content into new knowledge in the knowledge base.

The knowledge analyst 15 monitors the author's backlog and provides a quality review 114 of the authoring output, and an additional output review 116. If the new knowledge requires additional input before it can be incorporated into the knowledge base, the knowledge analyst 15 uses the escalation process 115 to obtain the additional input (from, for example, the customer whose product is the subject matter of the new knowledge). Once the additional input is obtained, the knowledge analyst 15 feeds it back to the author 14, who updates the new knowledge, and passes it back to the analyst 15 for another quality review.

Specifications are developed for reports, described below, to inform authors 14 of the need to maintain the knowledge base and to assist the knowledge analysts 15 in managing authoring output backlog. Some of those reports are the same as those developed by the knowledge monitoring system 430, and some of the reports use some of the same metrics as developed by the knowledge monitoring system.

The knowledge maintenance system 450 (including the processes 28, the backlog management, the maintenance authoring process, the reports, and the metrics that are developed) is described in detail in the co-pending patent application, U.S. Ser. No. 09/379,687, entitled *Method and System for Use and Maintenance of a Knowledge Base System*, by Sharon Stier, Debra Haughton, and Joseph Melino (Applicant Reference No. S1/P04). It was filed on the even date herewith, and herein incorporated by reference.

Graphic User Interface 480

Specifications 482 for the knowledge base's graphic user interface (GUI) 480, shown as GUI 480 in FIG. 1a, are developed to accommodate the knowledge base architecture 342 and all of the specifications 412 for the knowledge base use process 410. A GUI document, not shown, is developed to detail screen flow and layout for a graphic user interface 480 designed to make agent querying and interaction reporting and administrative maintenance and monitoring as painless as possible.

Figure 1E:
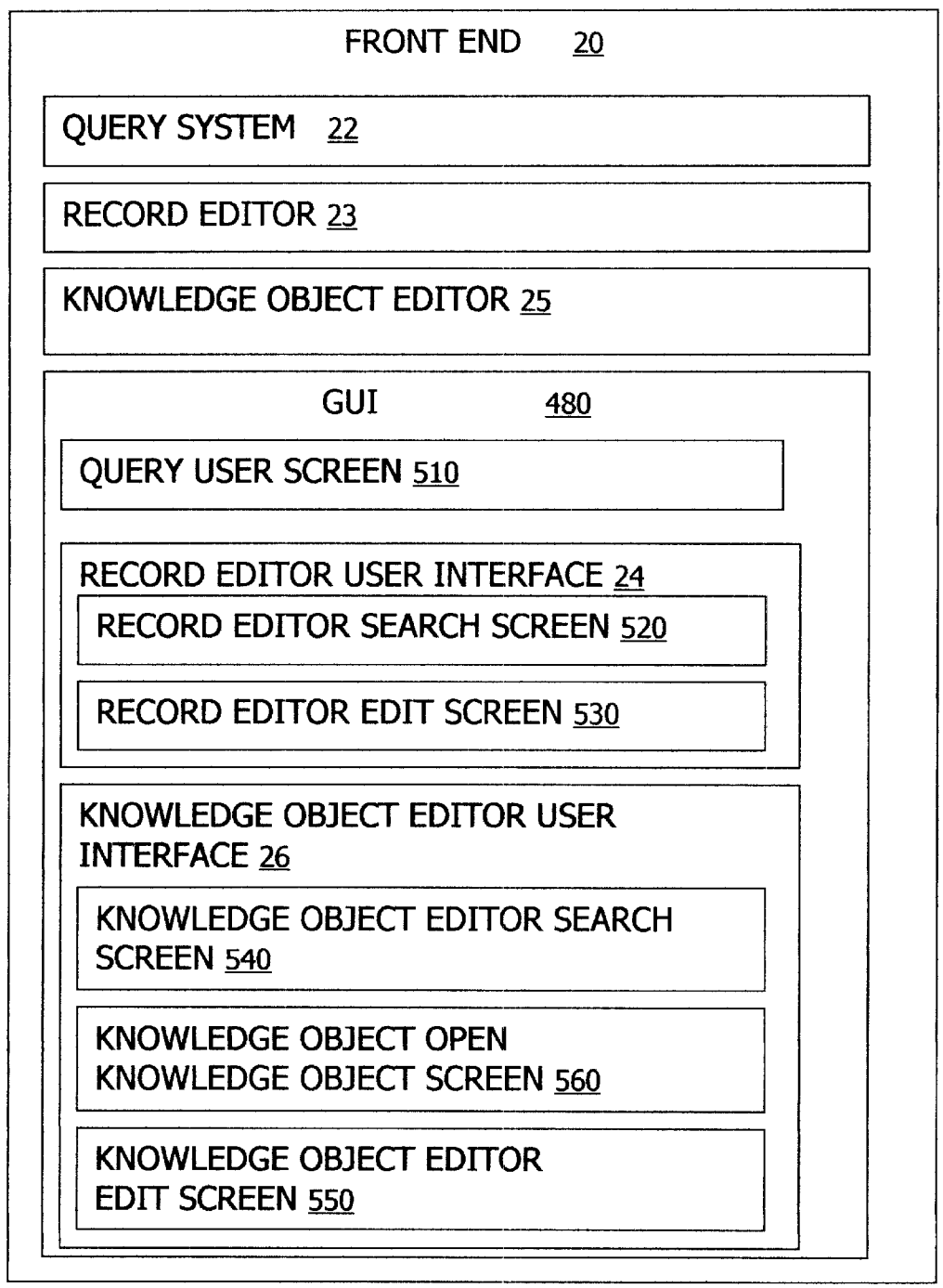

Returning to FIGS. 1a and 1e, for the knowledge base of the preferred embodiment, the graphic user interface (GUI) 480 has the necessary elements to provide access to all of the back end tools such as the knowledge monitoring reporting subsystem 42 and knowledge maintenance reporting subsystem 46. The user interface for the reporting subsystems 42, 46 are not described in detail hare because any conventional report generating user interface may be used to implement the reporting subsystems described below. The graphic user interface 480 also has the necessary elements to provide access to all of the front end tools that are used to support the knowledge base, for example, the query system 22, the record editor 23, and the knowledge object editor 25. Specifically, as shown in FIG. 1e, the GUI 480 has a record editor user interface 24 for the record editor 23. The record editor user interface 24 has a record editor search screen 520 and a record editor edit screen 530. The GUI 480 also has a knowledge object editor user interface 26 for the knowledge object editor 25. The knowledge object editor user interface 26 has a knowledge object editor record search screen 540, a knowledge object editor open knowledge object screen 560, and a knowledge object editor edit screen 550. Finally, the GUI 480 has a query user screen 510 for the query system 22.

The graphic user interface 480 is described in detail in the co-pending patent application, U.S. Ser. No. 09/379,694, entitled *Method and System for Use and Maintenance of a Knowledge Base System*, by Sharon Stier, Debra Haughton, and Joseph Melino (Applicant Reference No. S1/P04). It was filed on the even date herewith, and herein incorporated by reference.

The Knowledge Monitoring System 430

General

Operational performance of an entity can be improved by improving knowledge use by the entity, which in turn can be improved by developing processes to build and sustain knowledge use by the entity. Such processes include systems to facilitate knowledge reuse, systems for determining and implementing best practices for using knowledge, and monitoring knowledge use by the entity. By monitoring knowledge use, an entity can monitor its operational performance.

One system to facilitate knowledge reuse involves storing the knowledge in a knowledge base, and a system to monitor knowledge use by the entity involves monitoring use of the knowledge base. Further, rewarding use of the knowledge base will result in building and sustaining knowledge use by the entity.

By monitoring use of its knowledge base, an entity can evaluate knowledge that it generates for efficiency of its knowledge generating system and for quality of the generated knowledge. Such evaluation requires monitoring use of the generated knowledge by the entity. When the generated knowledge is stored in a knowledge base, measuring the use of the knowledge base provides monitoring of the use of the generated knowledge.

Measurement is critical to ensure the success of a knowledge base program. The health of the program is monitored, corrections can be made, and working towards common goals motivates all participants. Knowledge metrics are measures of the efficiency of the knowledge generating process and the quality of the knowledge used by the agents in providing support. They are measures of return on the knowledge from the customers' perspective. Since they measure knowledge use, they should be part of a support agent's employee performance review, in order to promote increased use of the knowledge base.

Figure 7:
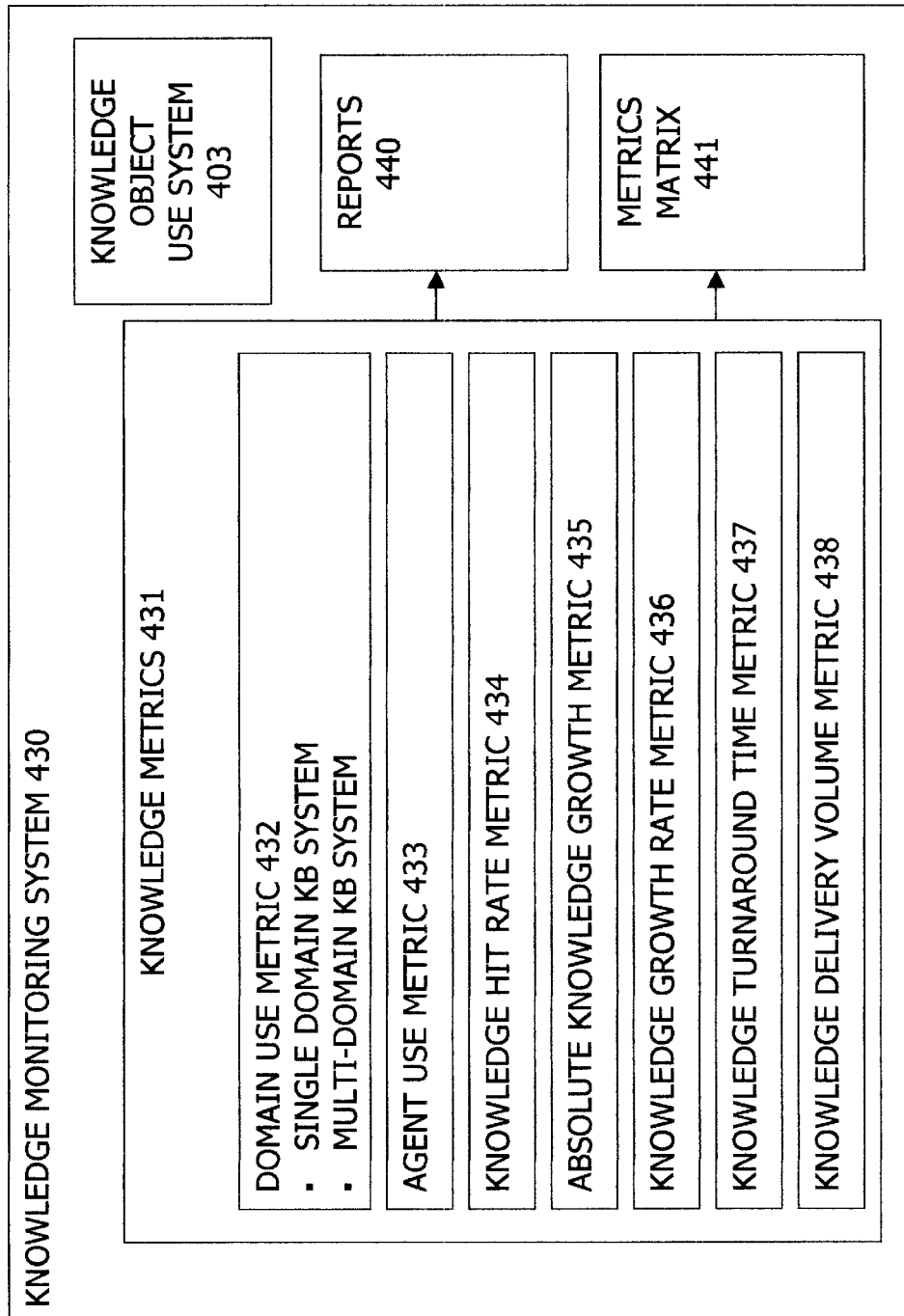

As shown in FIG. 7, he knowledge monitoring system 430 involves measuring knowledge base use, by developing knowledge metrics 431 from the measurements of knowledge use and providing knowledge monitoring reports 440 of the metrics 431. The uses to which the knowledge base have been put are stored in the knowledge base memory 35. A knowledge monitoring system 430 collects and counts the uses, using the capabilities described below to compile the knowledge metrics 431 described below from the counts described blow, and generates the reports 440 described below.

Knowledge Metrics 431

As shown in FIG. 7, the knowledge metrics 431 with which knowledge base use is measured include a Domain Use Rate metric 432, an Agent Use Rate metric 433, a Knowledge Hit Rate metric 434, an Absolute Knowledge Growth metric 435, a Knowledge Growth Rate metric 436, a Knowledge Turnaround Time metric 437, and a Knowledge Delivery Volume metric 438.

The Domain Use Rate metric 432 is the frequency that the knowledge base is queried in response to a request for information about a domain, compared to the total number of requests for information involving the domain for a selected period of time. It is calculated as a percentage derived from the number of knowledge base queries for the domain over the number of transactions involving the domain. Preferably, the Domain Use Rate metric 432 is measured in transactions.

The Agent Use Rate metric 433 is the percentage calculated from the number of agents that have queried the knowledge base in a selected period of time in response to a request for information, compared to the total number of agents responding to requests for information on a domain.

The Knowledge Hit Rate metric 434 is a percentage calculated from the number of times that an acceptable resolution is found to a request for information when the knowledge base is queried, compared to the total number of times that the knowledge base is queried, for a selected period of time.

Measuring knowledge base use is also accomplished by measuring the growth of the generated knowledge in the knowledge base in a selected time period. In the preferred embodiment, it is tracked monthly. The Absolute Knowledge Growth metric 435 is the change in the count of the number of active knowledge during a selected period. The Knowledge Growth rate metric 436 is a percentage calculated from the Absolute Knowledge Growth metric 435, compared to a count of the number of active knowledge objects 360 in the knowledge base memory 35 at the beginning of the selected period of time.

The Knowledge Turnaround Time metric 437 is the average time elapsed from the time that a suggestion is made for new knowledge to be incorporated into the knowledge base until the time of availability of the new knowledge in the knowledge base The Knowledge Delivery Volume metric 438 is the volume of knowledge delivered to a customer. When, as in the preferred embodiment, the generated knowledge is developed in response to requests for information at the request of a second entity, such as a customer or product vendor, monitoring generated knowledge use further can be measured by the amount of knowledge delivered to the second entity.

The series of metrics that are used to monitor use of the generated knowledge can be organized into a metric matrix 441 to identify the knowledge metrics 431 and facilitate reporting and analysis of the use of generated knowledge.

Metrics 431 Development

Once the knowledge metrics 431 are defined, specifying the knowledge monitoring system 430 involves developing specifications for the functionality required to generate the knowledge metrics.

Domain Use Rate Metric 432

The Domain Use Rate metric 432, also known as Domain Use metric 432, is calculated as a percentage derived from the number of knowledge base queries for the domain, divided by the total number of transactions involving the domain that are handled by the support team. Preferably, the Domain Use Rate is measured in transactions.

Figure 8:
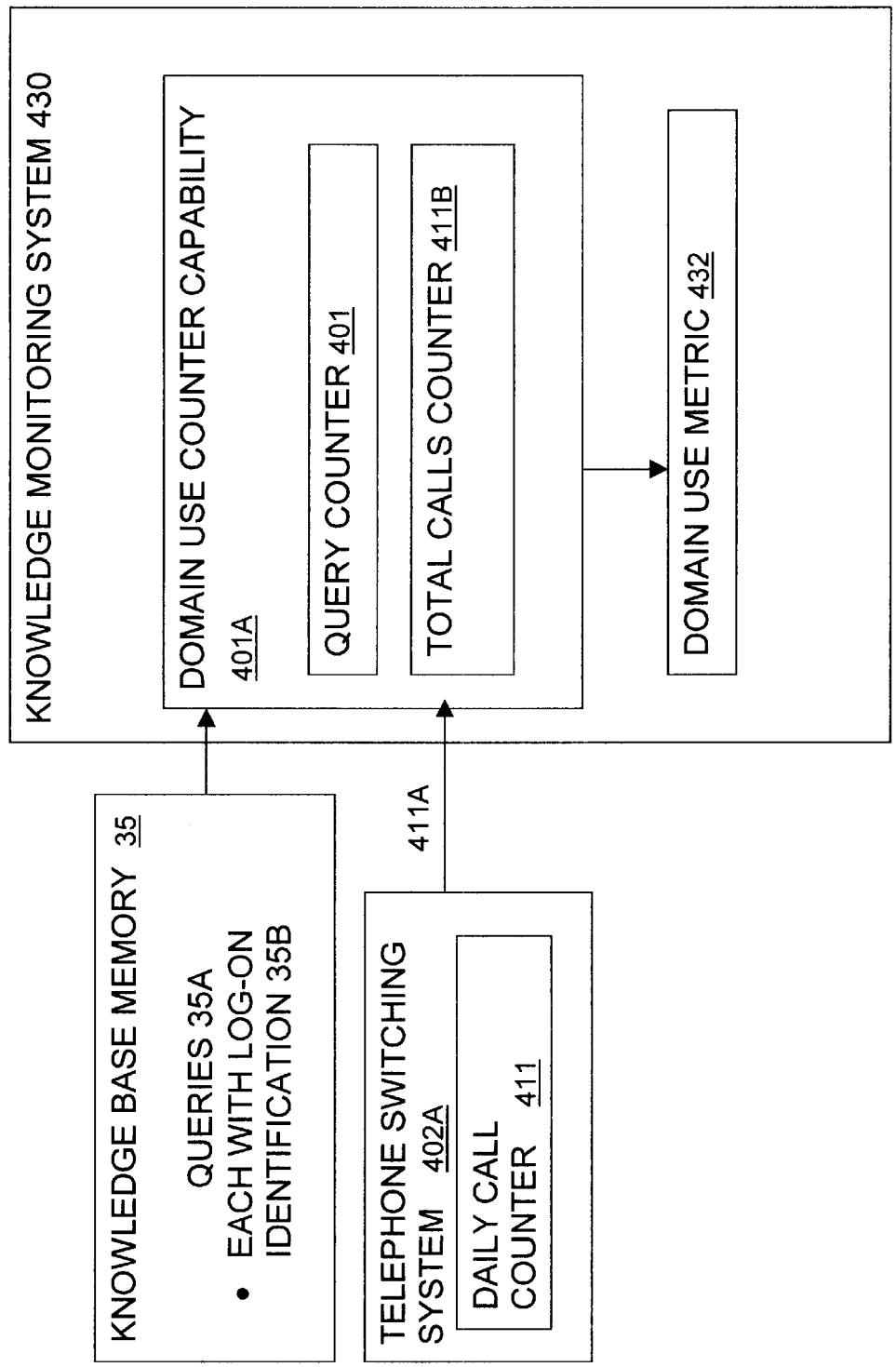
FIG. 8 is a block diagram of the development of the single-domain Domain Use metric 432 shown in FIG. 7.

When the subject of the knowledge base system 10 is simply the domain in question, the single-domain Domain Use Metric 432 is developed as shown in FIG. 8. The number of knowledge base queries 35*a* for the domain would be the total number of knowledge base queries, which could be developed by query counter capability 401*a* (shown as the domain use counter capability 401*a* in FIG. 8) of the knowledge monitoring system 430, which would have a query counter 401 to store the number of queries 35*a* saved between a beginning and end of the selected period of time.

When the knowledge monitoring system 430 develops the single-domain Domain Use Rate, it identifies the selected period of time and the beginning and end dates for the selected period. It then retrieves the agent queries 35*a* that were stored between the selected beginning and end dates. The query counter 401 increments every time query counter capability 401*a* identifies an agent query 35*a* that occurred between the identified beginning and end dates.

Only agent queries are used to develop the Domain Use metric 432 because the Domain Use Rate metric is intended to track the extent of the use of the knowledge base system 10 to provide technical support, and the only use to which agents put the system 10 is for providing technical support. Author and analyst uses of the knowledge base are more likely to be related to maintenance of the memory 35 and less likely to be related to providing technical support, and so are not counted.

The query counter capability 401*a* is able to segregate agent queries from author or analyst queries by inspecting the log-on identification 35*b* that is stored with each query. Each agent 13 is assigned a knowledge base log-on identification 35*b*, which she uses to sign in at the start of a query. When the agent 13 saves a query, the knowledge engine 30 stores with the query the identification of the person who activated the save of the query. When the knowledge monitoring system 430 retrieves a query saved during a selected period of time, if the number belongs to a knowledge author 14 or knowledge analyst 15, query counter capability 401*a* would recognize that the knowledge base system was accessed for knowledge authoring or maintenance, and not in response to a query. If the number belongs to an agent 13, the query counter capability 401*a* would recognize that the knowledge base was accessed to be queried, and the query counter capability 401*a* would then increment the knowledge base query counter 401. When the monitoring system has retrieved all of the queries 35*a* from the selected period, the counter 401 would hold the number of agent knowledge base queries between the beginning and end dates.

If the support team handles only one domain, the total number of transactions involving the domain for the support team would be the total number of transactions for the support team. The team's telephone switching system 402*a* could have a daily call counter 411 to keep track of the total number of transactions. As a call is answered, the telephone switching system 402*a* would increment the daily call counter 411. Every day, after storing the value of the daily call counter 411, it resets the daily call counter 411 to zero.

The knowledge monitoring system 430 would have a data link 411a to the telephone switching system 402a to obtain the stored values of the daily call counter 411. When the knowledge monitoring system 430 identifies the beginning and end dates for the selected period, the domain use counter capability 401a retrieves the stored values of the daily call counter 411 for the dates between the beginning and end of the selected period. The domain use counter capability 401a develops the total number of transactions by summing the stored daily values and storing the sum in the total calls counter 411b. The knowledge monitoring system 430 would then develop the Domain Use Rate metric 432 by dividing the value of the knowledge base query counter 401 by the total calls counter 411b.

Figure 9:
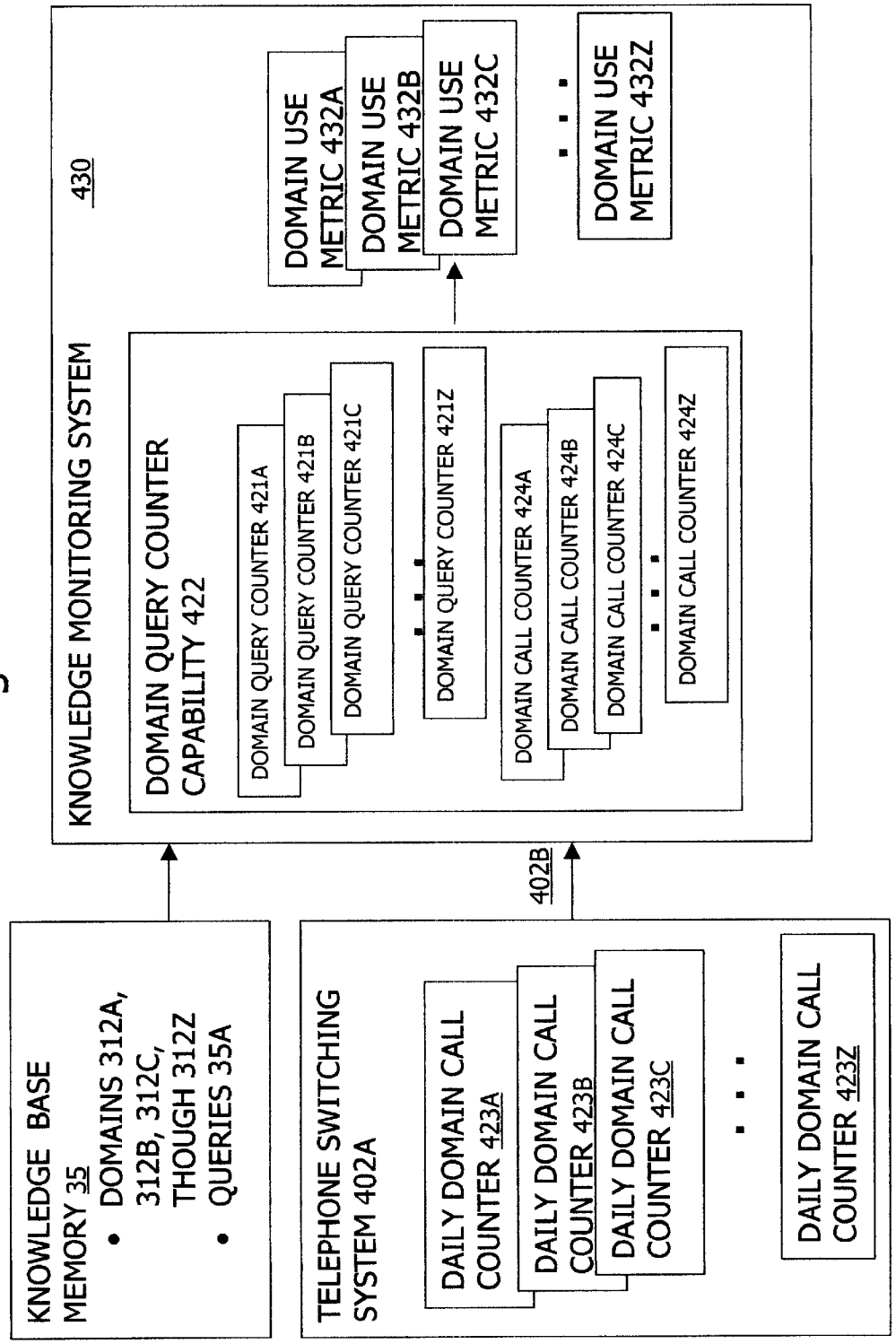
FIG. 9 is a block diagram of the development of the multi-domain Domain Use metrics 432a through 432z.

The generation of the Domain Use Rate metric 432 is more complicated when the knowledge base system 10 and the support team supports more than one domain. Multi-domain Domain Use Metrics 432a, 432b, 432c through 432z, also known as Domain Use Metrics 432a, 432b, 432c through 432z or Domain Use Rate Metrics 432a, 432b, 432c through 432z, are developed, one for each domain 312a, 312b, 312c through 312z supported by the knowledge base system 10. As shown in FIG. 9, a domain query counter capability 422 of the knowledge monitoring system 430 would have a domain query counter 421a, 421b, 421c through 421z for every domain 312a, 312b, 312c through 312z to store the number of queries 35a saved in an associated domain between a beginning and end of the selected period of time.

When the knowledge monitoring system 430 develops the multi-domain Domain Use Rate, it again identifies the selected period of time and the beginning and end dates for the selected period. It also retrieves the agent queries 35a that were stored between the selected beginning and end dates. A domain query counter 421a, 421b, 421c, through 421z increments every time that the domain query counter capability 422 identifies an agent query 35a that occurred between the identified beginning and end date and that was for the domain 312a, 312b, 312c, through 312z with which the domain query counter 421a, 421b, 421c, through 421z is associated.

When a query 35a is developed about a domain 312c, information is entered about the Hardware, Software, and Environment into the Hardware, Software, and Environment records 361. The information in one or more of the records 361 will identify the domain 312c being queried. When the agent 13 saves her interaction, the knowledge engine 30 stores the particulars that can identify the subject domain. When the knowledge monitoring system 430 retrieves a query saved during a selected period of time, it not only recognizes that the query was saved by an agent 13, but also recognizes from the saved query records the identity of the domain 312c, and it increments the associated domain query counter 421c. The values of the domain query counters 421a, 421b, 421c through 421z are the number of knowledge base queries in the domains 312a, 312b, 312c through 312z for the selected period.

For a multi-domain support team, the telephone switching system 402a would have daily domain call counters 423a, 423b, 423c through 423z, one for every domain 312a, 312b, 312c through 312z supported by the team using the telephone switching system 402a. The daily domain call counters 423a, 423b, 423c though 423z increment every time a call comes in about the domain 312a, 312b, 312c through 312z with which the daily domain call counter 423a, 423b, 423c through 423z is associated. For example, when an agent accepts a call about a domain 312c, she inputs the identity of the domain 312c into the call tracking as part of her call administrative tasks. In response, the telephone switching system 402a increments the associated daily domain call counter 423c. Every day, after storing the values of the daily domain call counters 423a, 423b, 423c though 423z, telephone switching system 402a resets the daily domain call counters 423a, 423b, 423c though 423z to zero.

The knowledge monitoring system 430 would have domain call counters 424a, 424b, 424c through 424z, one for every domain 312a, 312b, 312c through 312z. It would also have a data link 402b to the telephone switching system 402a to obtain the stored values of the daily domain call counters 423a, 423b, 423c though 423z. When the knowledge monitoring system 430 identifies the beginning and end dates for the selected period, the domain query counter capability 422 retrieves the stored values of the daily domain call counters 423a, 423b, 423c though 423z for the dates between the beginning and end of the selected period.

The domain query counter capability 422 develops the total number of transactions for all of the domains 312a, 312b, 312c through 312z for the period by summing the stored daily values of the daily domain call counters 423a, 423b, 423c though 423z, and storing each sum in its associated domain call counter 424a, 424b, 424c through 424z. The domain query counter capability 422 would develop the Domain Use Rate metrics 432a, 432b, 432c through 432z for domain 312a, 312b, 312c through 312z by dividing the values of the domain queries counters 421a, 421b, 421c through 421z by their respective domain call counters 424a, 424b, 424c through 424z.

Agent Use Rate Metric 433

Figure 10:
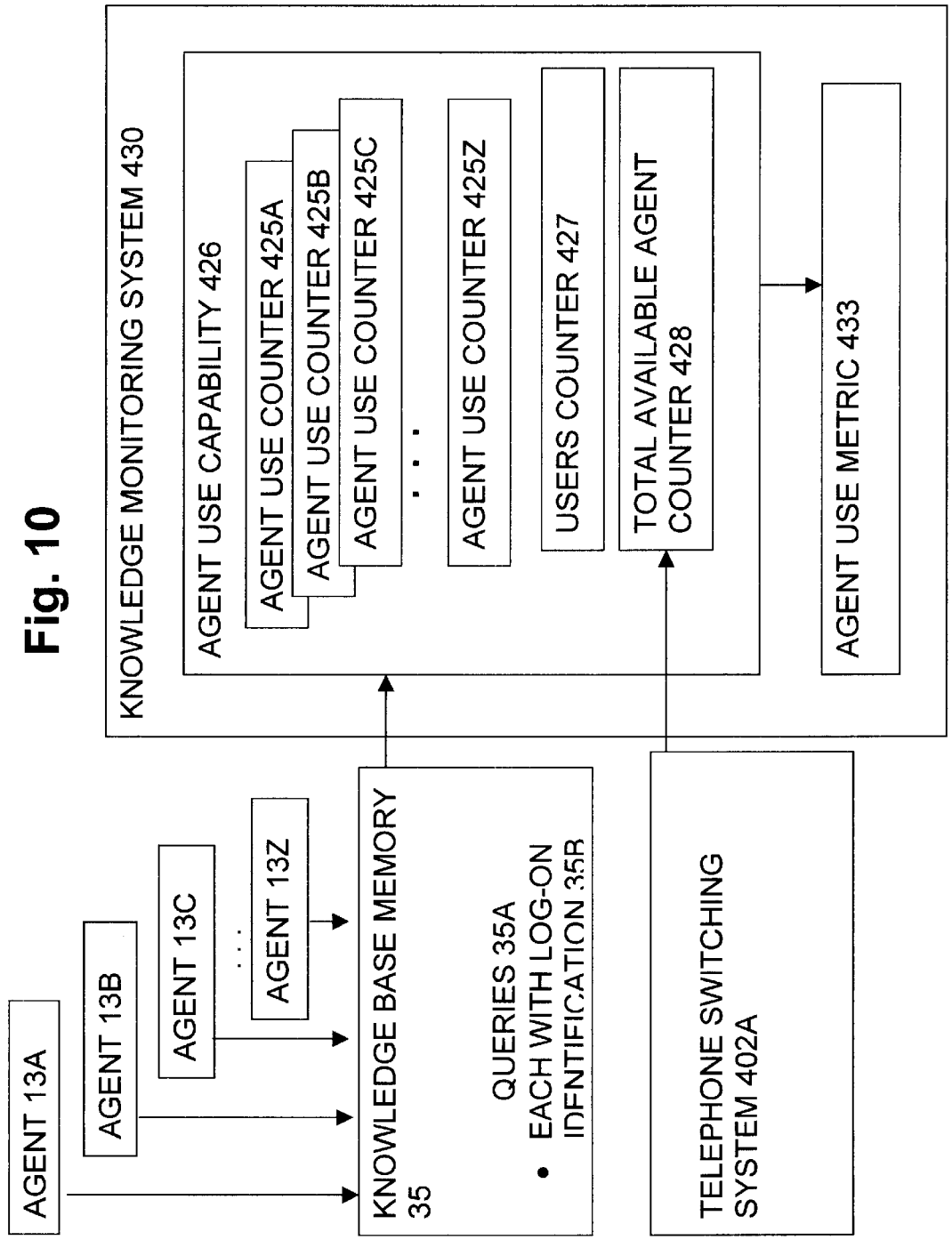
FIG. 10 is a block diagram of the development of the Agent Use metric 433 shown in FIG. 7.

The Agent Use Rate metric 433, also known as the Agent Use metric 433, is calculated as a percentage derived from the number of agents 13a, 13b, 13c through 13z that have queried the knowledge base in a selected period of time, divided by the total number of agents on the team who are authorized to use the knowledge base system 10 to respond to requests for information on a domain. Development of the Agent Use metric 433 is shown in FIG. 10. The knowledge monitoring system 430 has an agent use capability 426 with an agent use counter 425a, 425b, 425c through 425z for every agent 13a, 13b, 13c through 13z who is authorized to use the knowledge base system 10.

Each agent 13a, 13b, 13c through 13z in a support team is assigned a knowledge base log-on identification 35b which she may use to sign in at the start of a query. The knowledge engine 30, upon recognizing that a query has been saved, stores the agent ID 35b associated with the query. When the knowledge monitoring system 430 develops the Agent Use Rate, it identifies the selected period of time and the beginning and end dates for the selected period of time, and retrieves the agent queries 35a that were stored between the selected beginning and end dates. For each query in the selected period, the agent use capability 426 would increment the agent use counter 425c associated with the agent 13c identified by the agent ID of the query. Thus, the agent use counters 425a, 425b, 425c through 425z are the numbers of knowledge base queries for each agent 13a, 13b, 13c through 13z in the selected period.

The capability 426 counts the number of non-zero agent use counters 425a, 425b, 425c through 425z and stores the total as the number of agents who queried the knowledge base in the selected time period, in a users counter 427. The agent use capability 426 also provides a total available agent counter 428 to store a count of the agent use counters 425a, 425b, 425c through 425z, which would be the count of the number of agents on the team, developed with data from the telephone switching system 402a. The telephone switching system 402a keeps track of the total number of agents on the team answering support requests at a time by tracking the total number of transactions for each agent 13a, 13b, 13c through 13z. If an agent 13b has taken no calls for whatever reason (illness, vacation, or another assignment), the telephone switching system 402a does not include the agent in the count of team members. When the knowledge monitoring system 430 develops the Agent Use Rate metric 433, it retrieves the count of available team agents and stores it in the total available agent counter 428. From these counters 427, 428, the agent use capability 426 develops the Agent Use Rate metric 433 by dividing the value of the users counter 427 by the value of the total available agent counter 428.

Knowledge Hit Rate Metric 434

Figure 11:
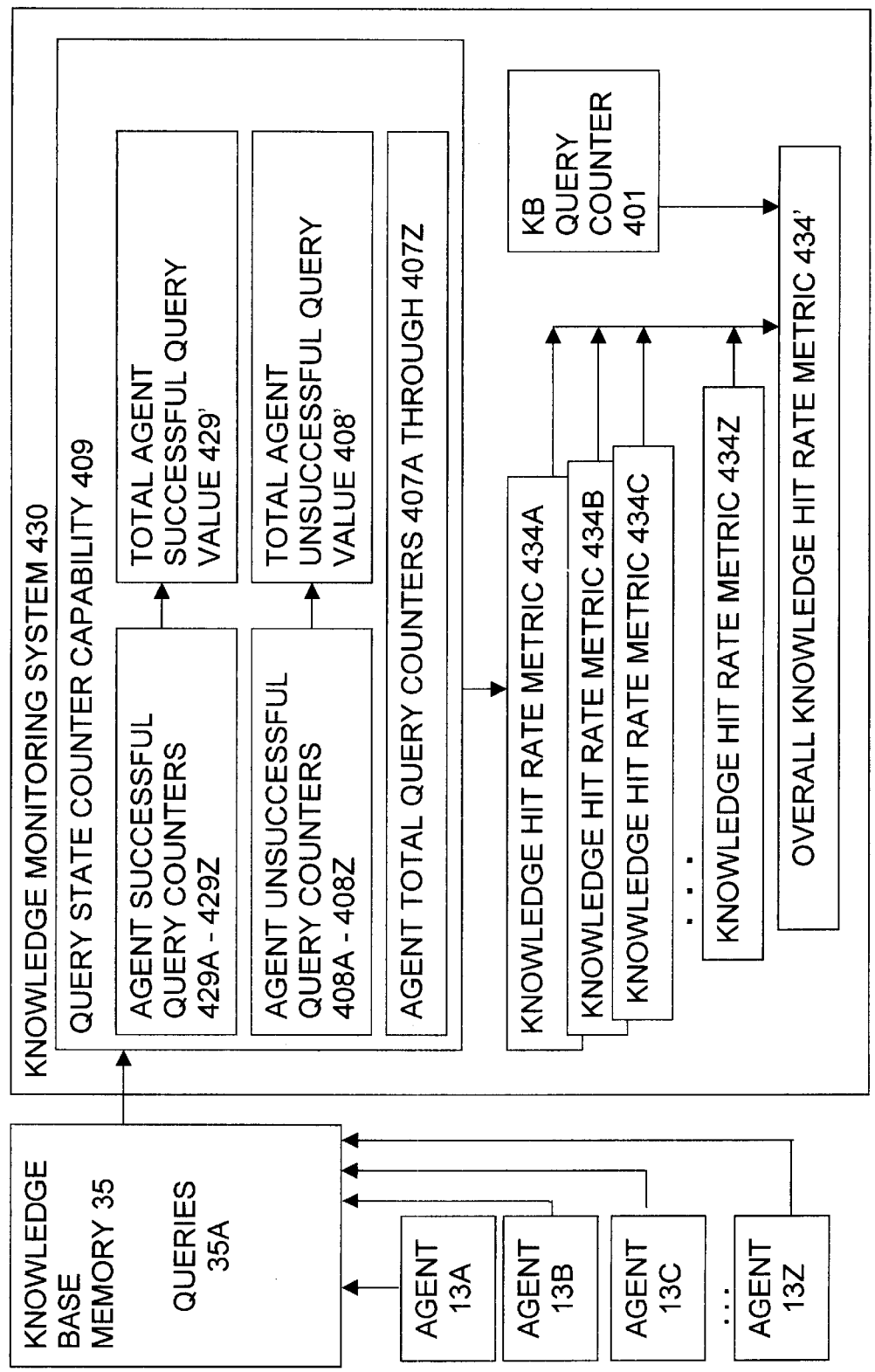
FIG. 11 is a block diagram of the development of the Knowledge Hit Rate metric 434a, 434b, 434c through 434z and the Overall Knowledge Hit Rate metric 434'.

The Knowledge Hit Rate metric 434 is calculated as the percentage derived from the number of times that an acceptable resolution is found to a request for information when the knowledge base is queried, divided by the total number of times that the knowledge base is queried, for a selected period of time. In the preferred embodiment, as shown in FIG. 11, a Knowledge Hit Rate metric 434a, 434b, 434c through 434z is developed for each agent 13a, 13b, 13c through 13z, and an Overall Knowledge Hit Rate metric 434' is developed for the entire set of knowledge base agent users.

The number of times that an acceptable resolution is found is counted as the number of times that queries are saved in the active state. When a query is saved, the knowledge engine 30 saves it in either an active, pending or draft state. If the state is active, the query represents an existing knowledge object 360 in the knowledge base memory 35. There is a strong likelihood that the resolution so retrieved, having been successful for the same symptoms and product particulars in the past, was successful for them in the present situation. The same can not be said for queries in the pending state, which represent a unique knowledge object and need additional review before determining whether the resolution was correct and therefore successful. Therefore, queries in the pending state should not be counted as successful resolutions (queries in draft states are also not included, because usually they are only temporarily in the draft state; eventually they are removed from draft state and saved in either active or pending state).

In order to develop the Knowledge Hit Rate metric 434, which comprise the Knowledge Hit Rate metrics 434a, 434b, 434c through 434z and the Overall Knowledge Hit Rate metric 434', the knowledge monitoring system 430 has a query state counter capability 409 with agent successful query counters 429a through 429z, one for each agent 13a through 13z, to store the number of times that an agent 13a through 13z saves a query in the active state. It also has agent unsuccessful query counters 408a through 408z to store the number of times that an agent 13a through 13z saves a query in the pending state. It also has agent total query counters 407a through 407z, one of each for each agent 13a through 13z, to store the sum of the values of the agent successful query counters 429a through 429z and the agent unsuccessful query counters 408a through 408z. Finally, as noted above with reference to the single-domain Domain Use metric 432, the knowledge monitoring system 430 has a knowledge base query counter 401 to store the total number of queries 35a in a selected period.

When the knowledge monitoring system 430 develops the Knowledge Hit Rate metrics 434a, 434b, 434c through 434z and the Overall Knowledge Hit Rate metric 434', it identifies the selected period of time and the beginning and end dates for the selected period of time, and retrieves the agent queries that were stored between the selected beginning and end dates. For each query in the selected period, the query state counter capability 409 identifies the agent 13a who saved the query and the state of the query. It ignores draft queries. It then increments the agent total query counter 407a that is associated with the agent 13a who stored the active or pending query. If the query is active, it also increments the associated agent successful query counter 429a. If the query is in the pending state, the capability 409 increments the agent unsuccessful query counter 408a. Thus, the agent successful query counters 429a through 429z store the number of times that each agent found an acceptable resolution during the selected period of time, and the agent unsuccessful query counter 408a through 408z store the number of time that each agent stored a pending query during the selected period of time, and the agent total query counters 407a through 407z store the number of times that each agent finalized any resolution during the selected period of time.

The query state counter capability 409 sums the successful query counters 429a through 429z to provide the total agent successful query value 429" for the selected time period, and sums the agent unsuccessful query counter 408a through 408z to provide the total agent unsuccessful query value 408' for the selected time period. The total agent unsuccessful query value 408' is also known as the total agent pending query value 408'. The knowledge monitoring system 430 then develops the Knowledge Hit Rate metrics 434a, 434b, 434c through 434z for the selected period of time by dividing the value of successful query counters 429a through 429z respectively by the agent total query counters 407a through 407z. The knowledge monitoring system 430 then develops the overall Knowledge Hit Rate metric 434' for the selected period of time by dividing the total agent successful query value 429' by the value of the knowledge base query counter 401.

Figure 5:
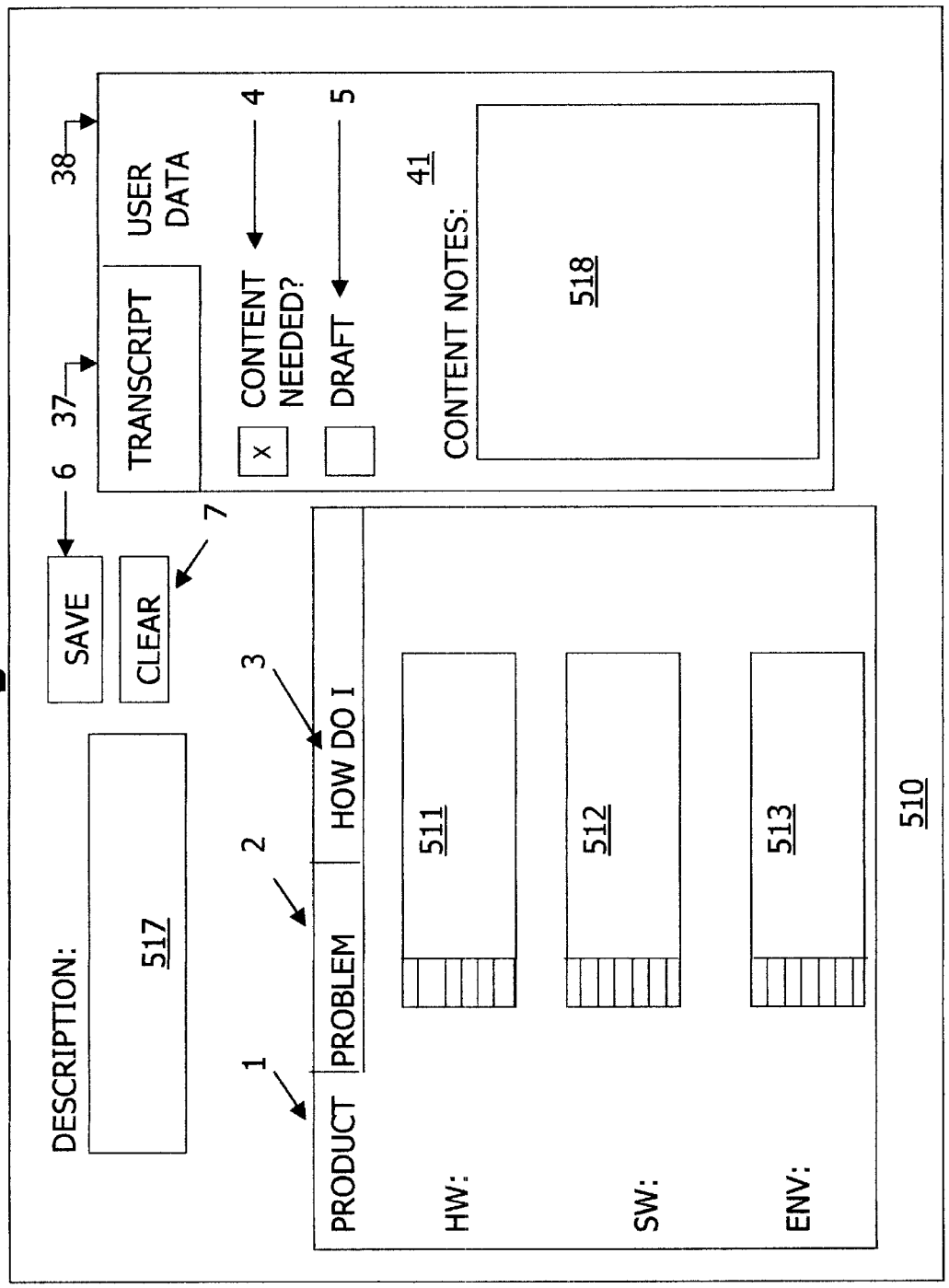
FIG. 5 is a block diagram of the query user screen 510 for the query system 22 when a Product tab and a User Data tab are selected.

The Knowledge Hit Rate so developed would only be an estimate of the number of times that an acceptable resolution is found because it is based on counting active queries, objects, which may also include queries that report content needed in the knowledge base. If desired, the Knowledge Hit Rate metric 434 could be made more accurate. The GUI 480 has a query user screen 510 for the query system 22. As shown in FIG. 5, the query screen 510 has fields for the architecturally defined record types 362, consisting of a Hardware field 511 for record type 362e, a Software field 512 for record type 362f, an Environment field 513 for record type 362g, and for the general record types, an Issue/Symptom field (not shown) for record type 362a, a Cause field (not shown) for record type 362b, a Resolution field 516 for record type 362c, and a "How do I . . . ?" field, not shown, for record type 362d. The fields are listed categorically under three descriptive tabs, a Product tab 1 for accessing the Hardware field 511, Software field 512, and Environment field 513; a Problem tab 2 for accessing the Issue/Symptom field, not shown, Cause field, not shown, and Resolution field, not shown; and a "How do I . . . ? tab 3 for accessing the "How do I . . . ?" field, not shown. The query user screen 510 when the Product tab 1 Is selected is shown in FIG. 5.

In addition, the query screen 510 has a Description field 517, which is a free unlabeled text field used for entering a description of the problem the caller is experiencing. It can contain the symptoms that callers are seeing, the product they are using, the function they are trying to perform, or any related environmental considerations (networks, operating systems, etc.).

The query screen 510 also has a Transcript tab 37 for accessing a transcript section, not shown, that displays a summary description of the use interaction, and a User Data tab 38 for accessing a contents notes section 41. The user interface available with the KnowledgeBridge™ processor from ServiceWare, Inc. of Oakmont, PA was modified to contain a content notes section 41 with a "Content Needed?" check box 4, a "Draft" check box 5, and a Content Notes field 518. The "Content Needed?" check box 4 is checked when the agent discovers an ambiguity or when she develops or improves a resolution.

Thus, reports of content needed in the knowledge base have an activated "Content Needed?" check box 4. Therefore, if desired, the Knowledge Hit Rate metric 434 could be made more accurate by having the knowledge engine 30 filter out any saved interactions in which the "Content Needed?" check box 4 is activated. However, the Knowledge Hit Rate so modified would still only be an estimate if the knowledge base system 10 tracks transactions and not incidents. If incidents are not tracked, it is difficult to determine whether a resolution was actually successful. The successful query counters 429a through 429z would count use interactions that might have seemed successful but actually required a call back to completely resolve the problem.

However, the Knowledge Hit Rate metrics 434a, 434b, 434c through 434z and the overall Knowledge Hit Rate metric 434' developed as described above provide dose approximations to the actual Knowledge Hit Rate and so are useful to show the extent of successful resolutions from using the system 10. In addition, the Knowledge Hit Rate metrics 434a, 434b, 434c through 434z and the Knowledge Hit Rate metric 434' are useful to show changes in the rate of successful resolution over time, because movement in the value of the metrics will likely be similar to the movement of the actual Knowledge Hit Rate over time.

Absolute Knowledge Growth Metric 435 and Knowledge Growth Rate Metric 436

Figure 12:
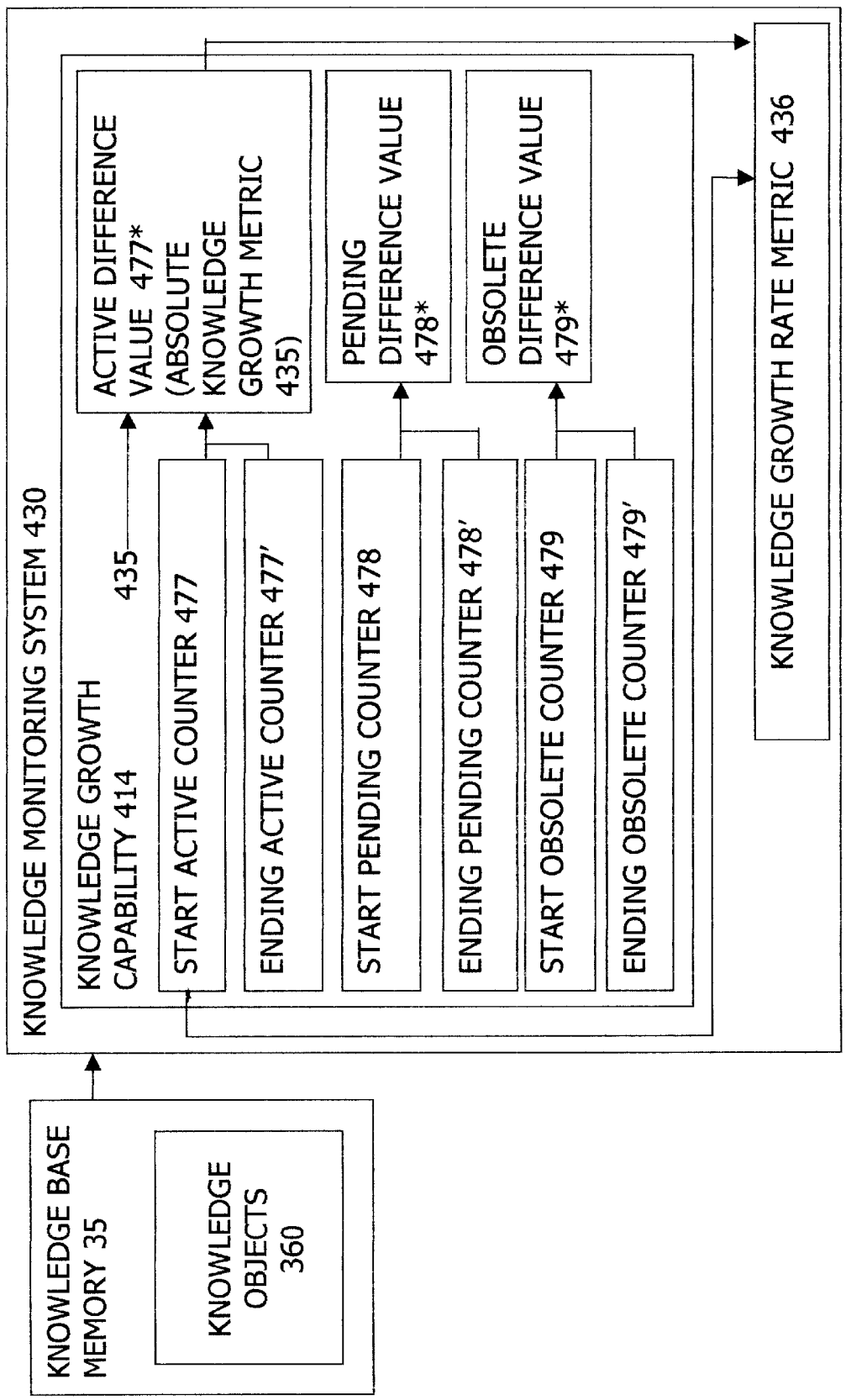
FIG. 12 is a block diagram of the development of the Absolute Knowledge Growth metric 435 and the Knowledge Growth Rate metric 436 shown in FIG. 7.

The Absolute Knowledge Growth metric 435, which is the size that the knowledge base grew during a selected period, is developed as shown in FIG. 12. When any changes are made to a knowledge object 360, such as when it was created, made pending, activated, returned to pending, obsoleted, the particulars of the change are recorded and stored with the knowledge object in the memory 35. The particulars include the change, the date of the change and the person effecting the change.

The knowledge monitoring system 430 has a knowledge growth capability 414 with a start active counter 477 and an end active counter 477' (shown as the ending active counter 477' in FIG. 12). When the knowledge monitoring system 430 develops the Absolute Knowledge Growth metric 435, it identifies the selected period of time and the beginning and end dates for the selected period of time, and retrieves all knowledge objects that were active on the start date of the selected period of time. It increments the start active counter 477 for every active knowledge object that it retrieves. It then retrieves all knowledge objects that were active on the end date of the selected period of time, incrementing the ending active counter 477' for every active knowledge object that it retrieves.

The knowledge growth capability 414 develops the active difference value 477* by subtracting the value of the start active counter 477 from the ending active counter 477'. The active difference value 477* is the Absolute Knowledge Growth metric 435. It then develops the Knowledge Growth Rate metric 436 by dividing the Absolute Knowledge Growth metric 435 by the value of the beginning active counter 477.

The knowledge growth capability 414 also stores other values and develops other metrics concerning knowledge object count in the memory 35, to be used in reports for the reporting systems 42, 46. For example, for the Pending Knowledge Objects Balance Sheet Report 461, it stores the number of pending knowledge objects at the start and end of the selected time period and the number of knowledge objects obsoleted during the selected time period to be used in.

The knowledge growth capability 414 develops the pending and obsolete knowledge object counts with a start pending counter 478, an ending pending counter 478', a start obsolete content counter 479 and an ending obsolete content counter 479'. When the knowledge monitoring system 430 develops the Pending Knowledge Objects Balance Sheet Report 461, it identifies the selected period of time and the beginning and end dates for the selected period of time, and retrieves all knowledge objects that were pending or obsolete on the start date of the selected period of time. It increments the start pending counter 478 for every pending knowledge object that it retrieves, and the start obsolete content counter 479 for every obsolete knowledge object that it retrieves. It then retrieves all knowledge objects that were pending or obsolete on the end date of the selected period of time, incrementing the ending pending counter 478' for every pending knowledge object that it retrieves, and the ending obsolete content counter 479' for every obsolete knowledge object that it retrieves.

The knowledge growth capability 414 develops the pending difference value 478* by subtracting the value of the start pending counter 478 from the end pending counter 478'. It develops the obsolete difference value 479* by subtracting the value of the start obsolete counter 479 from the ending obsolete counter 479'.

Knowledge Turnaround Time Metric 437

The Knowledge Turnaround Time metric 437, also known as the Turnaround Time metric 437, may be developed manually, with authors 14 keeping track of when they receive a report of need for knowledge base content and when they activate the new knowledge developed therefrom in the knowledge base. The authors' records could be used to develop average turnaround times for each author 14, which could be averaged to develop a team turnaround time.

Figure 13:
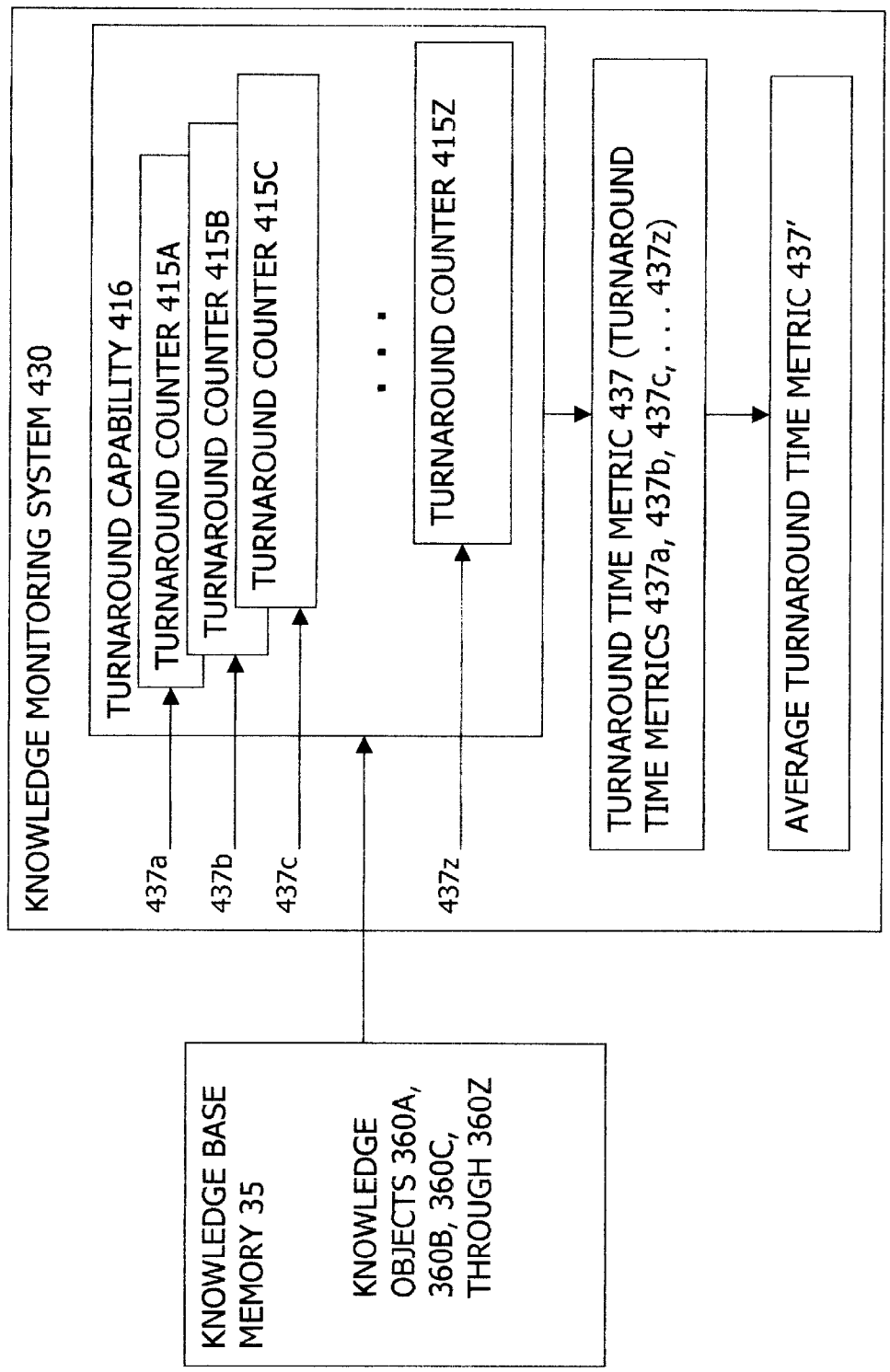
FIG. 13 is a block diagram of the development of the Turnaround Time metric 437 shown in FIG. 7.

Alternatively, the knowledge turnaround time could be developed as shown in FIG. 13. When a knowledge object is saved, the engine stores the creation date and the date activated. The knowledge monitoring system 430 has a turnaround capability 416 having turnaround counters 415a, 415b, 415c, through 415z for each knowledge object 360a, 360c, 360c, through 360z in a set.

When the knowledge monitoring system 430 develops the Knowledge Turnaround Time metric 437, it identifies the selected period of time and the beginning and end dates for the selected period of time, and retrieves all of the knowledge objects that were activated during the selected period of time. The turnaround capability 416 then counts for each knowledge object in the returned set the number of days between the dates of the creation and activation, stores the count in the counters 415a, 415b, 415c, through 415z, and provides the Turnaround Time metric 437, which is the associated Turnaround Time metrics 437a, 437b, 437c, through 437z, in instantiation reports of the knowledge objects 360a, 360b, 360c, through 360z.

The turnaround capability 416 could also average the values of the counters 415a, 415b, 415c, through 415z for defined sets of knowledge objects to develop an Average Turnaround Time 437', and provide aggregation reports of the averages.

Knowledge Delivery Volume Metric 438

The Knowledge Delivery Volume metric 438 is generated by keeping a count of the number of new knowledge objects delivered to a second entity in a selected period. The metric 438 could be developed by counting the number of active knowledge objects reported in a periodic report to a customer, or it could be the count of the number of new knowledge objects activated in the selected period of time.

Figure 14:
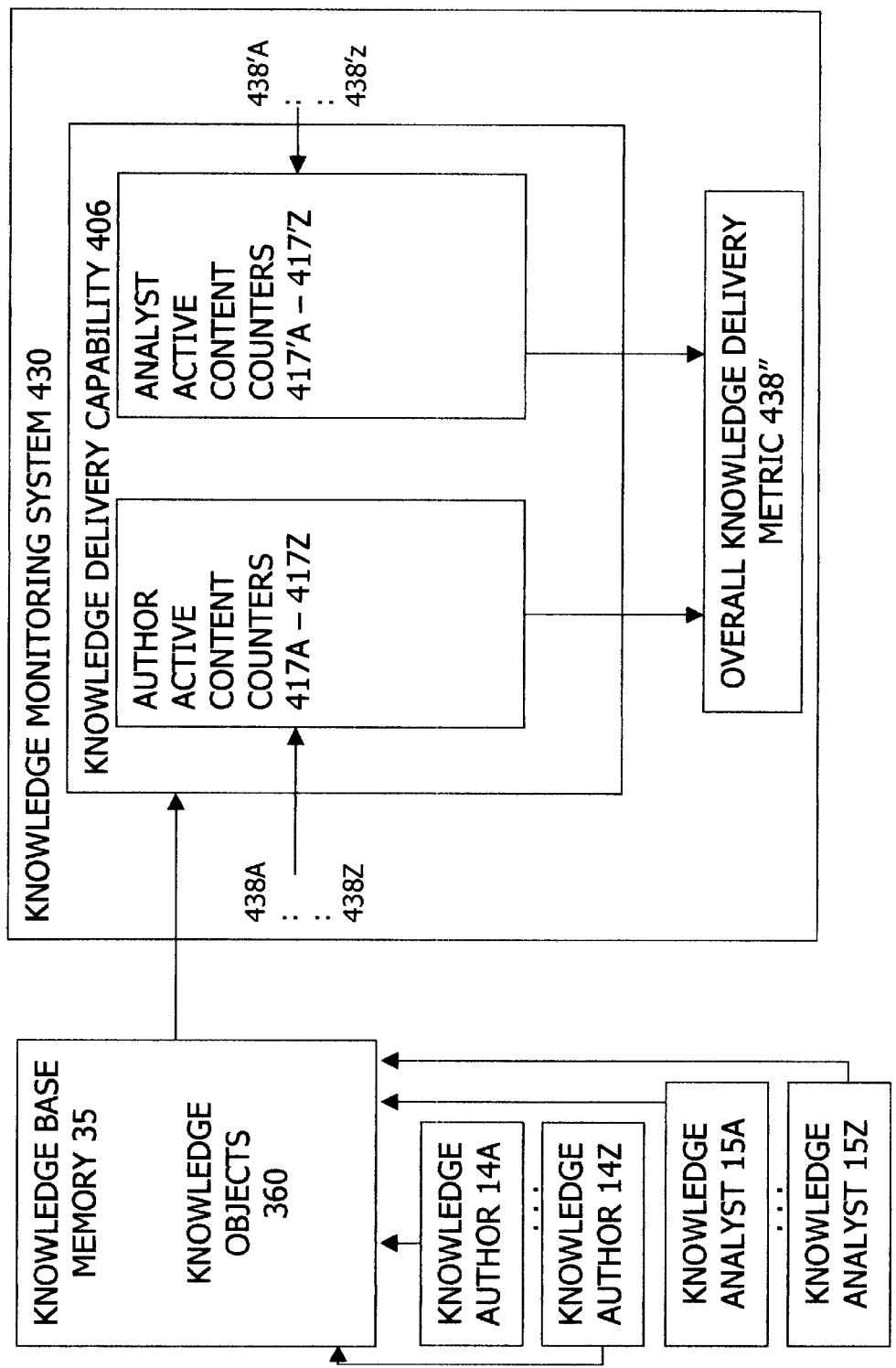
FIG. 14 is a block diagram of the development of the Knowledge Delivery volume metric 438a through 438z and 438'a through 438z and the Overall Knowledge Delivery metric 438"

The knowledge monitoring system 430 develops the Knowledge Delivery Volume metric 438, which comprises Knowledge Delivery Volume metric 438a through 438z for each knowledge author 14a through 14z and Knowledge Delivery Volume metric 438'a through 438'z for each knowledge analyst 15a through 15z. As seen in FIG. 14, the knowledge monitoring system 430 develops the Knowledge Delivery Volume metric 438a through 438z, 438'a through 438'z by keeping track of how many knowledge objects 360 have been activated by each knowledge author 14a through 14z and knowledge analyst 15a through 15z during the selected period. The knowledge monitoring system 430 has a knowledge delivery capability 406 that develop the knowledge object activation count for each knowledge author 14a through 14z and knowledge analyst 15a through 15z using author active content counters 417a through 417z, one for each knowledge author 14a through 14z, and analyst active content counters 417'a through 417'z, one for each knowledge analyst 15a through 15z.

Agent knowledge object activation is not tracked because knowledge agents do not activate knowledge objects. As discussed above, the knowledge maintenance system 450 provides that only knowledge authors 14a through 14z and knowledge analysts 15a through 15z are able to activate knowledge objects. Knowledge agent input into the knowledge base is always in the pending state. Knowledge authors 14a through 14z and and knowledge analysts 15a through 15z activate by adding new knowledge objects to the knowledge base memory 35, or by removing the pending status of agent queries, which are stored in the memory 35 as pending knowledge objects 360. Knowledge object activation occurs when a knowledge author 14a through 14z or knowledge analyst 15a through 15z saves the query. In response, the knowledge engine 30 stores the knowledge object, saving with it its date of activation and the identification of the person who activated it.

When the knowledge monitoring system 430 develops the Knowledge Delivery Volume metric 438, which is the Knowledge Delivery Volume metrics 438a through 438z and 438'a through 438'z for each knowledge author 14a through 14z and knowledge analyst 15a through 15z, the capability 406 identifies the selected period of time and the beginning and end dates for the selected period of time, and retrieves all of the knowledge objects having dates of activation between the start and end dates of the selected period of time. For each knowledge object, the monitoring system 430 identifies the person who activated the object and increments the appropriate one of the author active content counters 417a through 417z or analyst active content counters 417'a through 417'z that is associated with the knowledge author 14a through 14z or knowledge analyst 15a through 15z who activated the knowledge object 360.

The author active content counters 417a through 417z and analyst active content counters 417'a through 417'z are the Knowledge Delivery Volume metrics 438a through 438z and 438'a through 438'z for each knowledge author 14a through 14z and knowledge analyst 15a through 15z. The knowledge delivery capability 406 then sums the Knowledge Delivery Volume metrics 438a through 438z and 438'a through 438'z to develop the Overall Knowledge Delivery Volume metric 438", shown as Overall Knowledge Delivery metric 438" in FIG. 14.

Knowledge Object Use System 403

As shown in FIG. 7, in addition to the developing the above metrics, the knowledge monitoring system 430 can track the number of times a selected knowledge object 360 is recorded in total and for a selected period of time using a Knowledge Object Use System 403. Knowledge object use tracking is also used in reports developed for the knowledge maintenance system 450, described below.

Figure 15:
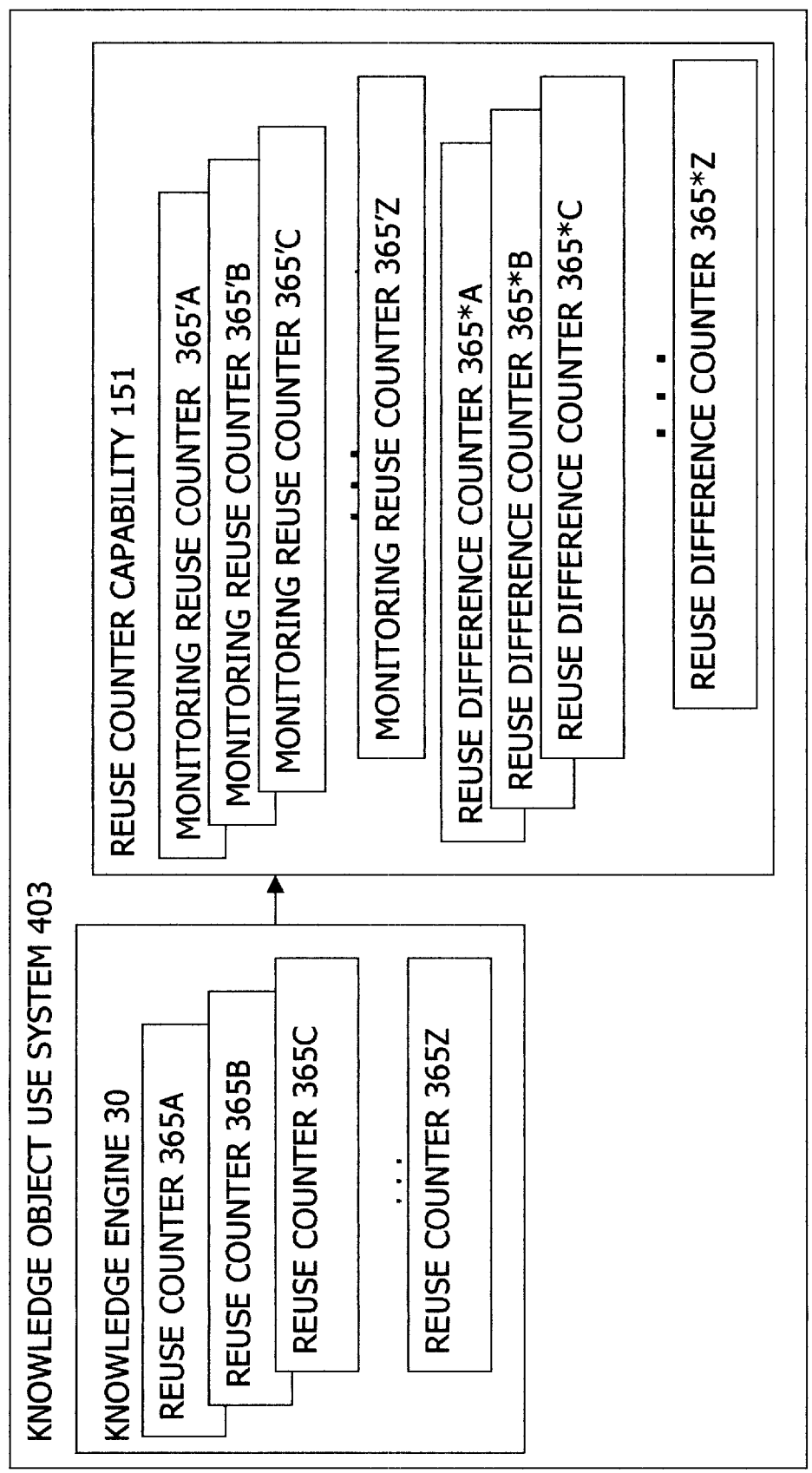
FIG. 15 is a block diagram of the Knowledge Object Use system 403 as shown in FIG. 7.

Referring to FIG. 15, the knowledge engine 30 has reuse counters 365a, 365b, 365c, through 365z, one for each knowledge object 360a, 360b, 360c, through 360z. The reuse counter 365r keeps track of the number of times the knowledge object 360r is recorded, which occurs every time that an agent 13 saves a query that matches the knowledge object 360r. The knowledge monitoring system 450 has a reuse counter capability 151 having monitoring reuse counters 365'a, 365'b, 365'c, through 365'z to store the current value of each reuse counter 365a, 365b, 365c, through 365z. It also has reuse difference counters 365*a, 365*b, 365*c, through 365*z to generate the number of times that the reuse counters 365a, 365b, 365c, through 365z were incremented during a selected period.

When the knowledge monitoring system 430 develops the number of times a selected knowledge object 360 is recorded, the reuse counter capability 151 identifies the selected period of time and the beginning and end dates for the selected period of time, and retrieves the values of the reuse counters 365a, 365b, 365c, through 365z, and retrieves all of the knowledge objects 360 the use of which were recorded during the selected period of time. The capability stores the value of each reuse counter 365a, 365b, 365c, through 365z in monitoring reuse counters 365'a, 365'b, 365'c, through 365'z and increments the reuse difference counters 365*a, 365*b, 365*c, through 365*z for each time that its associated knowledge object 360 was recorded during the selected period of time.

Reporting subsystems 42, 46 General

Specifications are also developed for the knowledge monitoring reporting subsystem 42 and the knowledge maintenance reporting subsystem 46 of the back end 40. Reporting specifications are developed detailing a standard set of internal and external reports. The reporting system of the preferred embodiment has a knowledge monitoring reporting subsystem 42 that supports the knowledge monitoring process 430 and a knowledge maintenance reporting subsystem 46 that supports the knowledge maintenance process 450. Any conventional report generating user interface may be used to implement the reporting subsystems described below.

Knowledge Monitoring Reporting Subsystem 42

Figure 16:
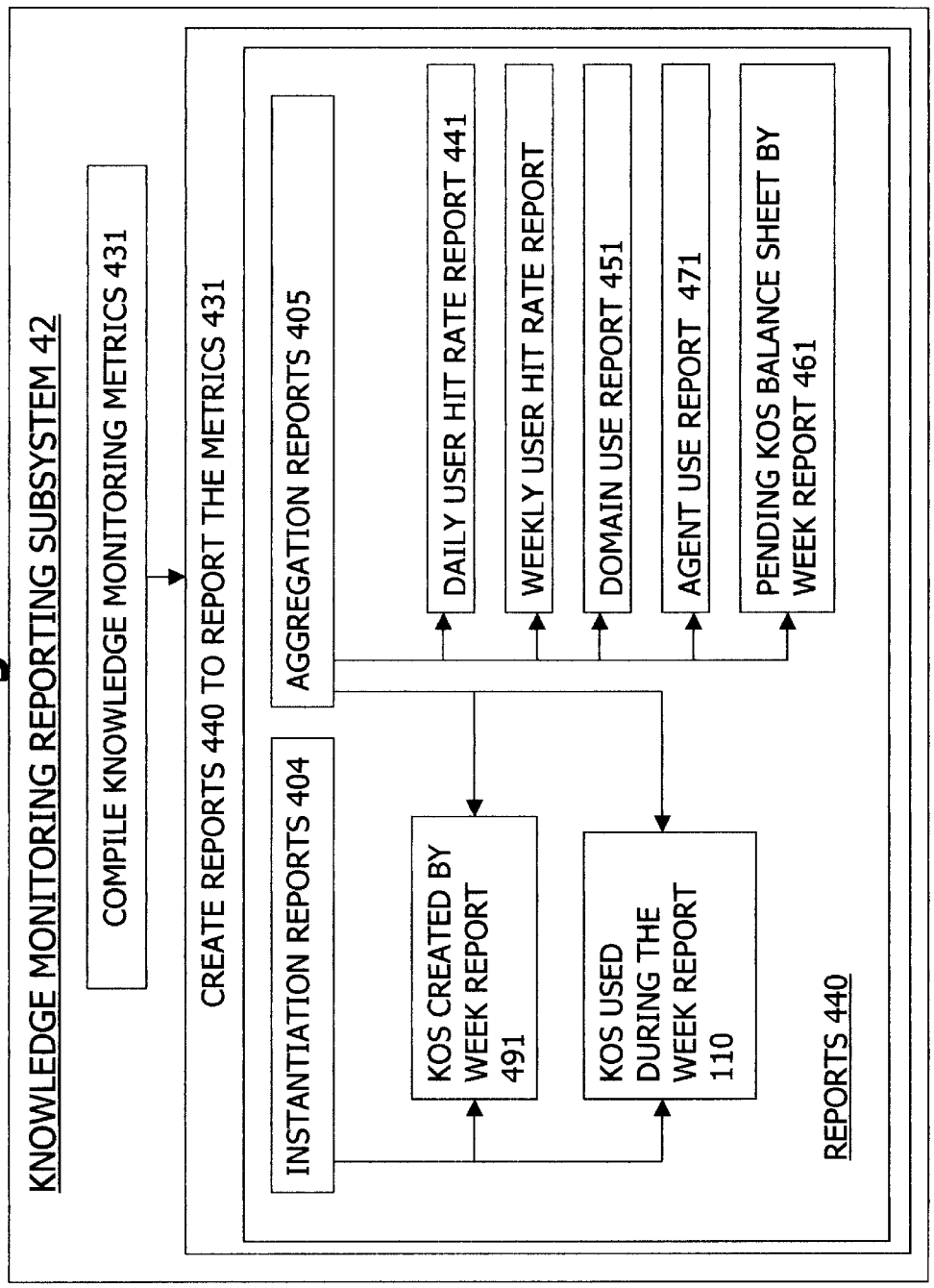

The knowledge monitoring reporting subsystem 42 shown in FIGS. 16 and 7 involves compiling a series of knowledge monitoring metrics 431, described above, and reports 440 created to test the use of the knowledge base system 10, the knowledge developed through the use of the knowledge base, and knowledge base user performance. It also provides feedback to the customer for whom the knowledge base system 10 is being developed on customer behaviors of their customers and actual product use within their installed base. The knowledge monitoring reporting subsystem 42 compiles and forwards monthly reports of the knowledge monitoring metrics 431 of the knowledge monitoring system 430, described above.

The metrics 431 are reported in instantiation reports 404 that document individual instances of use of the knowledge base. Instantiation reports 404 identify for each instance of use at least one query presented to the knowledge base and resolutions suggested by the knowledge base. Instantiation reports 404 are useful because, through them, one can review actual questions presented and resolutions attempted.

Metrics 431 are also reported in aggregation reports 405, where data is compiled and reduced to show trends and progress. Aggregation reports 405 document the above described metrics 431 and other metrics demonstrating use of the knowledge base. They track for a selected period of time the number of times an event occurs in the knowledge base. The aggregation reports are created by polling the above-described and other counters that keep track of the number of times the event occurs. One type aggregation is to track for a selected period the number of times a selected knowledge object 360 is accessed. One such aggregation report, the Knowledge Objects Used during the Week report 110, shown in FIG. 17 and described with reference to the reuse difference counters 365*a, 365*b, 365*c, through 365*z and the monitoring reuse counters 365'a, 365'b, 365'c, through 365'z shown in FIG. 15, is a report that provides a printout of the knowledge objects that are accessed during the week. Although, like an instantiation report, it details all the particulars of the subject knowledge object, it is an aggregation report because it also reports the number of times the selected knowledge object 360 has been accessed in total and for the selected week.

Figure 17:
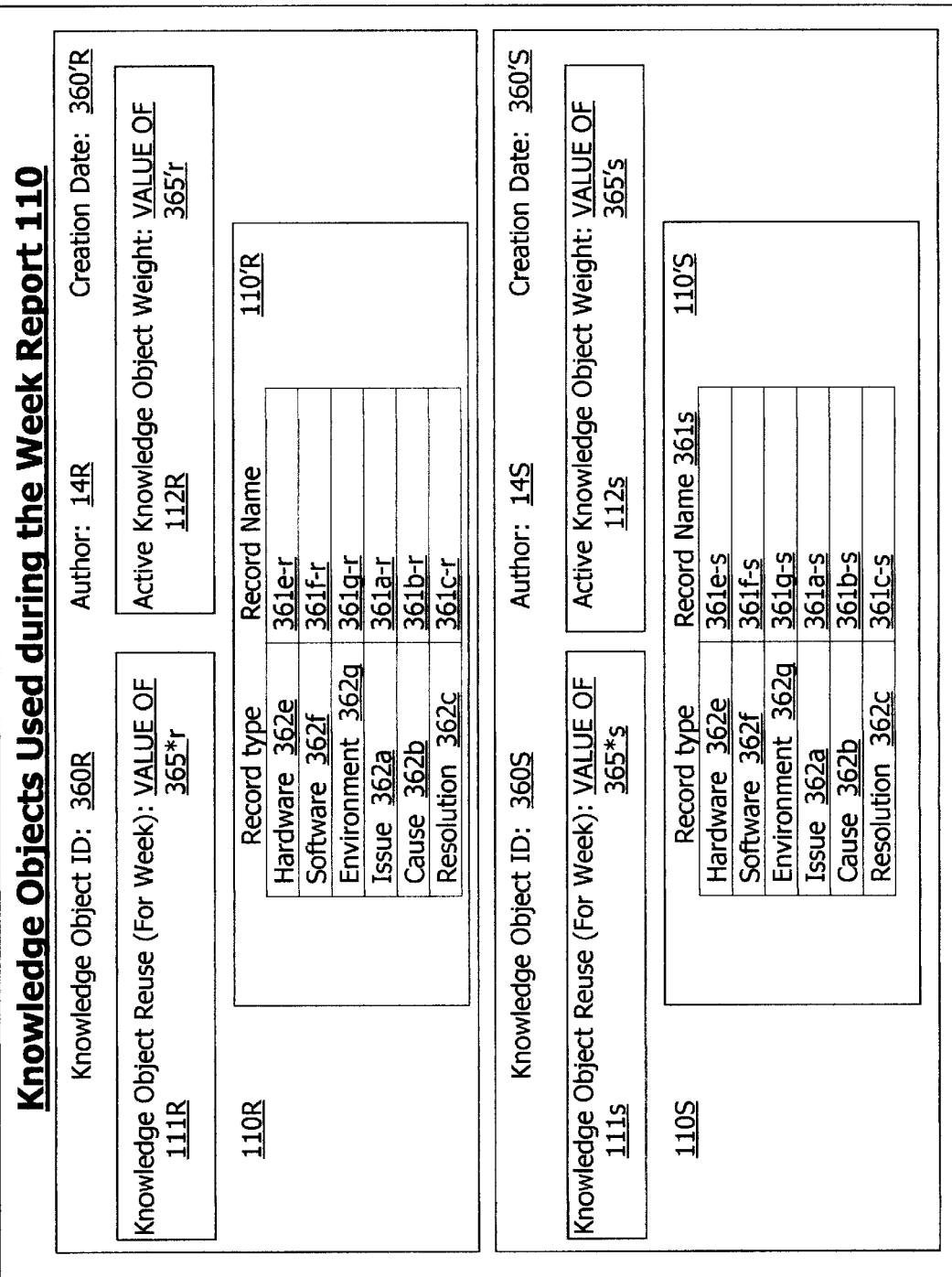
FIG. 17 is an example of the Knowledge Objects Used During The Week report 110 shown in FIG. 16.

In the illustrative Knowledge Objects Used during the Week report 110 shown in FIG. 17, knowledge objects 360r and 360s were used in the selected week. The Knowledge Objects Used during the Week report 110 has Knowledge Object entries 110r, 110s to identify the knowledge objects 360r, 360s, and their respective authors 14r, 14s and Creation Dates 360'r, 360's. It also contains record entries 110'r, 110's to identify the records 361r, 361s, respectively, of the knowledge objects 360r, 360s, organized by their record type 362. The record entry 110'r shows that knowledge object 360r has record 361e–r of the Hardware record type 362e, record 361f–r of the Software record type 362f, record 361g–r of the Environment record type 362g, record 361a–r of the Issue record type 362a, record 361b–r of the Cause record type 362b and record 361c–r of the Resolution record type 362c. The record entry 110's shows that knowledge object 360s has record 361e–s of the Hardware record type 362e, record 361f–s of the Software record type 362f, record 361g–s of the Environment record type 362g, record 361a–s of the Issue record type 362a, record 361b–s of the Cause record type 362b and record 361c–s of the Resolution record type 362c.

The Knowledge Object entries 110r, 110s have Knowledge Object Reuse (For Week) entries 111r, 111s for displaying values of the reuse difference counters 365*r, 365*s respectively, for the knowledge objects 360r, 360s used in the selected week. The Knowledge Object entries 110r, 110s also have Active Knowledge Object Weight entries 112r, 112s for displaying the value of the monitoring reuse counters 365'r, 365's, respectively, for the knowledge object 360a through 360z used in the selected week. The Active Knowledge Object weights 365'r, 365's are the number of the times that the knowledge objects 360r, 360s, respectively, have been used to provide a successful resolution from life to date. The Knowledge Objects Used during the Week report 110 is used to show the extent of knowledge reuse and the number of times that a question is answered.

Returning to FIG. 16, other aggregation reports in which the knowledge metrics are reported include a Daily User Hit Rate report 441, a Weekly User Hit Rate report 481, a Domain Use report 451, a Pending Knowledge Objects Balance Sheet by Week report 461, an Agent Use report 471, and a Knowledge Objects Created by Week report 491.

The Knowledge Hit rate metric 434, which is the Knowledge Hit rate metric 434a through 434z for each knowledge agent 13a through 13z who use the knowledge base system 10 during the time period at issue, is reported in a Daily User Hit Rate report 441, shown in FIG. 18, and a Weekly User Hit Rate report 481, shown in FIG. 19, both Figures being described below with reference to the Knowledge Hit Rate metrics 434a, 434b, 434c through 434z and the Overall Knowledge Hit Rate metric 434' shown in FIG. 11.

The Daily User Hit Rate report 441 of FIG. 18 has an Agent column 443 that identifies all agents 13a through 13z who are users of the knowledge base system 10 during the day at issue. It has a Pending Use column 444 and an Active Use column 445 containing for each agent 13a through 13z the values, respectively, of the agent unsuccessful query counters 408a through 408z and the agent successful query counters 429a through 429z for the selected day. The last entries in the Pending Use column 444 and Active Use column 445 are the total agent unsuccessful query value 408' and total agent successful query value 429' for the selected day.

The Daily User Hit Rate report 441 also has a Total Use column 446 with entries which are the sum of the entries in each row of the Pending Use column 444 and Active Use column 445. The Total Use column 446 contains the total number of queries that an agent accessed during the day, specifically the values of the agent total query counters 407a through 407z for the selected day. The last entry 407' in the Total Use column 446 is the value of the knowledge base query counter 401. The Daily User Hit Rate report 441 also has a Knowledge Hit Rate column 447 which displays the values of the Knowledge Hit Rate metrics 434a through 434z for the selected day. The last entry in the Knowledge Hit Rate column 447 is the overall Knowledge Hit Rate metric 434'.

Similarly, the Weekly User Hit Rate report 481 of FIG. 19 has an Agent column 483 that identifies all agents 13a through 13z who are users of the knowledge base system 10 during the week at issue. It has a Pending Use column 484 and an Active Use column 485 containing for each agent 13a through 13z the values, respectively, of the agent unsuccessful query counters 408a through 408z and the agent successful query counters 429a through 429z for the selected week. The last entries in the Pending Use column 484 and Active Use column 485 are the total agent unsuccessful query value 408' and total agent successful query value 429' for the selected week.

The Weekly User Hit Rate report 481 also has a Total Use column 486 with entries which are the sum of the entries in each row of the Pending Use column 484 and Active Use column 485. The Total Use column 486 contains the total number of queries that an agent accessed during the week, specifically the values of the agent total query counters 407a through 407z for the selected week. The last entry 407' in the Total Use column 486 is the value of the knowledge base query counter 401. The Weekly User Hit Rate report 481 also has a Knowledge Hit Rate column 487 which displays the values of the Knowledge Hit Rate metrics 434a through 434z for the selected week. The last entry in the Knowledge Hit Rate column 487 is the overall Knowledge Hit Rate metric 434'.

The Domain Use rate metric 432 for a multi-domain knowledge base, which is the Domain Use Rate metric 432a through 432z for each of the domains 312a through 312z, is reported in a Domain Use report 451, shown in FIG. 20 and described with reference to the Domain Use Rate metric 432a through 432z shown in FIG. 9. The Domain Use report 451 has a Domain column 452, which identifies all domains 312a through 312z in the knowledge base system 10. Next, it has a Queries column 453 containing, for each domain 312a through 312z, the number of queries for the selected period, which, as described above for FIG. 9, are recorded in the domain query counters 421a through 421z.

The Domain Use report 451 also has a Transactions column 454 containing, for each domain 312a through 312z, the contents of the domain call counters 424a through 424z, which are the number of transactions handled for the domains for the selected time period. It also has a Domain Use Rate Metrics column 455 containing the Domain Use Rate metric 432a through 432z for each of the domains 312a through 312z.

The Agent Use Rate metric 433 is displayed in an Agent Use Report 471, shown in FIG. 21 and described with reference to the Agent Use Rate metric 433 shown in FIG. 10. The Agent Use Rate metric 433 has a No. Agents Used column 473 containing the value of the users counter 427, which is the number of agents who used the knowledge base in the selected time period. The report 471 also has a No. Agents Authorized and Available column 474 containing the value of the total available agent counter 428, which is the total number of agents authorized to use the system 10. Finally, the report 471 has an Agent Use Rate column 475 containing the Agent Use Rate metric 433.

The Absolute Knowledge Growth metric 435, Knowledge Growth Rate metric 436, and Average Turnaround Time 437' are reported In a Pending Knowledge Objects Balance Sheet by Week report 461, shown in FIG. 22 and described with reference to the total agent pending query value 408' shown as the total agent unsuccessful query value 408' in FIG. 11, the start pending counter 478, the ending pending counter 478', the obsolete difference value 479*, the Absolute Knowledge Growth metric 435, and the Knowledge Growth rate metric 436 shown in FIG. 12, and the Average Knowledge Turnaround Time metric 437' shown in FIG. 13. The Pending Knowledge Objects Balance Sheet by Week report 461 shows the extent of progress in a selected week toward eliminating authoring backlog. The Pending Knowledge Objects Balance Sheet by Week report 461 contains a Pending Start column 462 to display the value of the start pending counter 478, which, as shown in FIG. 12, is the number of pending knowledge objects in the knowledge base memory 35 at the start of the week. Returning to FIG. 22, the Pending Knowledge Objects Balance Sheet by Week report 461 also has a Pending Added column 463 to display the value of the total agent pending query value 408' developed, as shown in FIG. 11, by the knowledge object state counter capability 409. The value 408' is the number of pending knowledge objects added during the week.

Returning to FIG. 22, the Pending Knowledge Objects Balance Sheet by Week report 461 also has a Pending Left column 464 to display the value of the ending pending counter 478', which, as shown in FIG. 12, is the number of pending knowledge objects left at the end of the week. Returning to FIG. 22, the Pending Knowledge Objects Balance Sheet by Week report 461 also contains a Promoted to Active column 465 to display the Absolute Knowledge Growth metric 435, which is the number of pending knowledge objects that were promoted to active state during the week and which is active difference value 477* (which is the Absolute Knowledge Growth metric 435) shown in FIG. 12. Returning to FIG. 22, the Pending Knowledge Objects Balance Sheet by Week report 461 has a Discarded to Obsolete column 466 to display the obsolete difference value 479*, which, as also shown in FIG. 12, is the number of knowledge objects that have been discarded to the obsolete state in the week.

Returning to FIG. 22, the Pending Knowledge Objects Balance Sheet by Week report 461 contains an Average Days to Active column 467 to display the Average Knowledge Turnaround Time metric 437', which, as shown in FIG. 13, is the average number of days that a knowledge object remained in the pending state before it was activated. The Pending Knowledge Objects Balance Sheet by Week report 461 contains a Rate % Activated column 456, shown as % Activated column in FIG. 22, that displays the Knowledge Growth rate metric 436 shown in FIG. 12.

The Overall Knowledge Delivery Volume metric 438", shown as Overall Knowledge Delivery metric 438" in FIG. 14, is reported in a Knowledge Objects Created by Week report 491, shown in FIG. 23 and described with reference to FIG. 16 and the Overall Knowledge Delivery metric 438" shown in FIG. 14, and the reuse difference counters 365*a, 365*b, 365*c, through 365*z and monitoring reuse counters 365'a, 365'b, 365'c, through 365'z shown in FIG. 15. As shown in FIG. 16, the Knowledge Objects Created by Week report 491 is another report that is both an instantiation report 404 and an aggregation report 405. The Knowledge Objects Created by Week report 491 is an instantiation report that identifies the particulars for all the knowledge objects created in the selected week and the value of their associated reuse difference counters 365*a, 365*b, 365*c, through 365*z and monitoring reuse counters 365'a, 365'b, 365'c, through 365'z, all shown in FIG. 15. However, for purposes of the knowledge monitoring subsystem 42, the Knowledge Objects Created by Week report 491 is also an aggregation report because the knowledge objects in the report 360 are totaled to provide the Overall Knowledge Delivery Volume metric 438", shown as Overall Knowledge Delivery metric 438" in FIG. 14, for the week.

In the illustrative Knowledge Objects Created by Week report 491 shown In FIG. 23, knowledge object 360r was used in the selected week. The knowledge object 360r is identified by Knowledge Object entry 110r, which was used in the Knowledge Objects Used during the Week Report 110 and was shown in FIG. 17 and described above in the discussion of FIG. 17.

Knowledge use may be monitored in any other way deemed appropriate for the organization. For example, the Knowledge Re-use by Suggestion Originator for the Week report 130, shown in FIG. 24 and described with reference to the reuse difference counters 365*a, 365*b, 365*c, through 365*z and monitoring reuse counters 365'a, 365'b, 365'c, through 365'z shown in FIG. 15, shows all of the knowledge objects that were used during the selected week, sorted by the agent who made the suggestion for the knowledge object by saving a unique query. The illustrative Knowledge Re-use by Suggestion Originator for the Week report 130 has a Suggestion Originator column 131 that identifies the agents who made suggestions in the selected week. It also has the Knowledge Objects Authored column 132 that simply lists by ID number all of the knowledge objects from the agent and that were used during the selected week. The Create Date column 133 identifies the creation date of the objects identified in the Knowledge Objects Authored column 132. As a measure of the quality of each agent's output, the report 130 has a Knowledge Object Reuse column 135 that displays the number of times that each knowledge object reported in the Knowledge Objects Authored column 132 was used that week by displaying the contents of the knowledge object reuse difference counter 365*a through 365*z (shown in FIG. 15) for the knowledge object.

In the Illustrative Knowledge Re-use by Suggestion Originator for the Week report 130 shown in FIG. 24, three knowledge objects, 360a, 360f, and 360u, which were suggested by agent 13w and used in the selected week, are identified by their identification numbers, ID 360a, ID 360f, and ID 360u in the Knowledge Objects Authored column 132 in the row associated with agent 13w. Their creation dates are listed as the dates DATE a, DATE f, DATE u respectively in the Create Date column 133 in the row associated with agent 13w. The number of times that the knowledge objects 360a, 360f, and 360u were used in the selected week is identified by the values stored in the reuse difference counters 365*a, 365*f, and 365*u respectively. in the Knowledge Object Reuse column 135 in the row associated with agent 13w.

The Knowledge Re-use by Suggestion Originator for the Week report 130 also shows that two knowledge objects, 360b and 360g, which were suggested by agent 13q and used in the selected week, are identified by their identification numbers, ID 360b, ID 360g respectively, in the Knowledge Objects Authored column 132 in the row associated with agent 13q. Their creation dates are listed as dates DATE b and DATE g respectively in the Create Date column 133 in the row associated with agent 13q. The number of times that the knowledge objects 360b, 360g were used in the selected week is identified by the values stored in the reuse difference counters 365*b and 365*g respectively in the Knowledge Object Reuse column 135 in the row associated with agent 13q.

The Knowledge Re-use by Suggestion Originator for the Week report 130 also has an Agents Total row 134w, 134q associated with each agent 13w, 13q in the Knowledge Reuse by Suggestion Originator for the Week report 130. The rows 134w, 134q appear after the row associated with agent 13w, 13q, and they display values 134"w and 134*w for agent 13w and values 134"q and 134*q for agent 13q.

The value 134"w, which is the number of knowledge objects suggested by the identified agent 13w and used that week, is found in the Knowledge Objects Authored column 132 and is the number of entries in the Knowledge Objects Authored column 132 for the agent 13w. Similarly, the value 134"q, which is the number of knowledge objects suggested by the identified agent 13q and used that week, is found in the Knowledge Objects Authored column 132 and is the number of entries in the Knowledge Objects Authored column 132 for the agent 13q. For agent 13w, value 134"w would be three, and for agent 13g, value 134"q would be two.

The value 134*w is the total number of times that suggestions from the agent 13w were used during the week, which is the sum of the values in the Knowledge Object Reuse column 135 for the agent 13w. Similarly, the value 134*q is the total number of times that suggestions from the agent 13q were used during the week, which is the sum of the values in the Knowledge Object Reuse column 135 for the agent 13q. Finally, the Knowledge Re-use by Suggestion Originator for the Week report 130 has a Totals row 134' for displaying the grand total of all entries in the Knowledge Objects Authored column 132 and the Knowledge Object Reuse column 135. For the illustrative Knowledge Re-use by Suggestion Originator for the Week report 130 of FIG. 24, the Totals row 134' has values 134'a, which is the sum of 134"w and 134"q, and value 134b, which is the sum of 134*w and 134*q.

The specifications for the knowledge monitoring reporting subsystem 42 further require the knowledge base architecture 342 to support the desired compilation and reporting of metrics, including the reuse counter and other required counters described herein.

Knowledge Monitoring System 430 Deployment

In the deployment phase 700, when the knowledge base system 10 goes live, the knowledge monitoring process 470 is deployed. Through it, the use of the knowledge base system 10 may be evaluated and monitored.

The knowledge monitoring process 430 involves operating the knowledge monitoring reporting subsystem 42 to compile and publish the knowledge metrics 431. As described above, the knowledge monitoring reporting subsystem 42 and the knowledge metrics 431 were both defined in the in-depth analysis phase 300 and implemented in the development phase 500, in order to provide for monitoring of knowledge use in the knowledge base system 10. The knowledge metrics reports, which in the preferred embodiment are published monthly, allows a company to evaluate the knowledge that it generates for efficiency of the knowledge generating system and for quality of the generated knowledge. By monitoring its knowledge use, an entity can monitor its operational performance.

The aggregation reports used to review knowledge generation and use within the organization include the Knowledge Objects Used during the Week report 110, Daily User Hit Rate report 441, Weekly User Hit Rate report 481, Domain Use report 451, Pending Knowledge Objects Balance Sheet by Week report 461, Agent Use report 471, and a Knowledge Objects Created by Week report 491. They are all described in detail above.

Conclusion

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A method of monitoring use of knowledge by an entity having said knowledge stored in a knowledge base and having systems to develop generated knowledge and to incorporate said generated knowledge into said knowledge base, comprising:

measuring said generated knowledge, wherein said measuring further comprises the steps of:
  a. defining characteristics of timeliness and amount of said generated knowledge;
  b. developing metrics for measuring said characteristics; and
  c. collecting data on said characteristics from said knowledge base and, using said metrics, creating measurements of said characteristics to measure said generated knowledge; and
monitoring said measuring said generated knowledge to monitor said knowledge use by said entity.

2. The method of claim 1, wherein one of said metrics comprises a measurement of growth of said knowledge incorporated into said knowledge base.

3. The method of claim 2,
  wherein said knowledge is stored in said knowledge base in a plurality of existing knowledge objects;
  wherein said growth of said knowledge incorporated into said knowledge base comprises adding new knowledge objects to said knowledge base; and
  wherein said measurement of growth further comprises a measure of absolute knowledge growth, which comprises a count of said new knowledge objects added to said knowledge base in a selected period of time.

4. The method of claim 3, wherein said measurement of growth comprises a measure of percentage of growth of said knowledge, which is a percentage calculated from said absolute knowledge growth, compared to a count of said existing knowledge objects in said knowledge base at a beginning time of said selected period of time.

5. The method of claim 1, wherein one of said metrics comprises a measure of a knowledge turnaround time which is an average time elapsed from a suggestion time, comprising a time that a suggestion is made for new knowledge to be incorporated into said knowledge base, until an availability time, comprising a time that said new knowledge is available in said knowledge base.

6. The method of claim 1, wherein said knowledge is developed in response to requests for information, and wherein one of said metrics comprises a measurement of growth of said knowledge delivered to a second entity by measuring a knowledge delivery volume, which is a count of a number of new knowledge delivered to said second entity in a selected period of time.

7. The method of claim 6, wherein said knowledge base is queried by users for said entity in response to requests for information, and wherein one of said metrics comprises an agent use rate metric that is a percentage calculated from a number of said users that have queried said knowledge base in a selected period of time in response to said requests for information, compared to a total number of said users responding to requests for information.

8. The method of claim 6, wherein one of said metrics comprises a knowledge hit rate metric that is a percentage calculated from a number of times that an acceptable resolution is found to a request for information when said knowledge base is queried, compared to a total number of times that said knowledge base is queried, for a selected period of time.

9. A method of monitoring use of knowledge by an entity having said knowledge stored in a knowledge base, comprising:
  measuring use of said knowledge base, wherein said measuring further comprises the steps of:
    a. defining characteristics of frequency of accessing said knowledge in said knowledge base and success from said accessing;
    b. developing metrics for measuring said characteristics; and
    c. collecting data on said characteristics from said knowledge base and, using said metrics, creating measurements of said characteristics to measure said use of said knowledge base; and
  monitoring said measuring said use of said knowledge base to monitor said knowledge use by said entity.

10. The method of claim 9,
  wherein said knowledge stored in said knowledge base comprises knowledge base knowledge,
  wherein responding to requests for information about a domain comprises at least one of the following steps:
    querying said knowledge base to access said knowledge base knowledge; and
    responding to said requests for information without querying said knowledge base;
  wherein a total number of said requests for information about said domain comprises a first number of times that said knowledge base is queried in response to said requests for information about said domain, and a second number of times in which said requests for information are responded to without querying said knowledge base; and
  wherein one of said metrics comprises a domain use rate metric that is a percentage calculated from said first number of times, compared to said total number for a selected period of time.

11. A method of improving operational performance of an entity, comprising:
  developing processes to build knowledge and sustain knowledge use by said entity, said developing further comprising the steps of
    a. developing systems to facilitate reuse of knowledge, further comprising storing said knowledge in a knowledge base;
    b. developing systems to develop generated knowledge and to incorporate said generated knowledge into said knowledge base;
    c. conduct monitoring of said knowledge use by said entity, further comprising using knowledge metrics to monitor timeliness and amount of said generated knowledge, using the steps of
      i. defining characteristics of said timeliness and said amount of said generated knowledge,
      ii. developing metrics for measuring each of said characteristics,
      iii. collecting data on said characteristics from said knowledge base and, using said metrics, creating measurements of said characteristics; and
      iv. monitoring said measurements to conduct said monitoring of said knowledge use by said entity; and
  analyzing said knowledge use by said entity to analyze said operational performance of said entity, further comprising analyzing said measurements to analyze said knowledge use, wherein analysis of said operational performance of said entity results in said improving said operational performance of said entity.

12. The method of claim 11, further comprising organizing said metrics into a metric matrix to identify said metrics, and facilitate reporting and analysis of said knowledge use.

13. A method of improving operational performance of an entity, comprising:
  developing processes to build knowledge and sustain knowledge use by said entity, said developing further comprising the steps of a. developing systems to facilitate reuse of knowledge, further comprising storing said knowledge in a knowledge base; and b. conducting monitoring of said knowledge use by said entity, wherein said monitoring further comprises using knowledge metrics to monitor using said knowledge base, using the steps of i. defining characteristics of frequency of accessing said knowledge in said knowledge base and success from said accessing, ii. developing metrics for measuring each of said characteristics, iii. collecting data on said characteristics from said knowledge base and, using said metrics, creating measurements of said characteristics; and iv. monitoring said measurements to conduct said monitoring of said knowledge use by said entity; and analyzing said knowledge use by said entity to analyze said operational performance of said entity, further comprising analyzing said measurements to analyze said knowledge use, wherein analysis of said operational performance of said entity results in said improving said operational performance of said entity.

14. The method of claim 13, wherein said monitoring of said knowledge use by said entity further comprises reporting on said use of said knowledge base, using a reporting system compiling instantiation reports documenting individual instances of said use, said instantiation reports identifying for each instance of said accessing said knowledge in said knowledge base at least one query presented and resolutions suggested by said knowledge base; and aggregation reports tracking for a selected period of time a number of times an event occurs in using said knowledge base, wherein said aggregation reports are created by polling selected counters, said counters keeping track of said number of times said event occurs.

15. The method of claim 13, further comprising organizing said metrics into a metric matrix to identify said metrics, and facilitate reporting and analysis of said knowledge use.

16. A method of monitoring operational performance of an entity, comprising conducting monitoring of use of knowledge by said entity to monitor said operational performance of said entity, said conducting said monitoring of said use of knowledge by said entity further comprising measuring use of a knowledge base, said knowledge base having said knowledge of said entity stored therein and knowledge about said use stored therein, by users of said knowledge base, said measuring said use further comprising evaluating, from said knowledge about said use, frequency of accessing said knowledge in said knowledge base and success from said accessing, and monitoring generated knowledge, comprising knowledge generated by said users, said monitoring said generated knowledge comprising evaluating, from said knowledge about said use, timeliness and amount of said generated knowledge.

17. A method of improving operational performance of an entity, comprising:

developing processes to build knowledge and sustain knowledge use by said entity, said developing further comprising the steps of a. developing systems to facilitate reuse of knowledge, further comprising storing said knowledge in a knowledge base; and b. developing systems to develop generated knowledge and to incorporate said generated knowledge into said knowledge base; and analyzing said knowledge use by said entity to analyze said operational performance of said entity, said analyzing said knowledge use further comprising analyzing use of said knowledge base by users of said knowledge base, using the steps of:

i. defining characteristics of timeliness and amount of said generated knowledge and of frequency of accessing said knowledge in said knowledge base and success from said accessing, ii. developing metrics for measuring said characteristics, iii. collecting data on said characteristics from said knowledge base and, using said metrics, creating measurements of said characteristics;

iv. monitoring said measurements to monitor said use of said knowledge base; and v. analyzing said monitoring of said measurements to analyze said use of said knowledge base, wherein said analyzing of said operational performance of said entity results in said improving said operational performance of said entity.

* * * * *